United States Patent [19]

Oda et al.

[11] Patent Number: 5,794,586
[45] Date of Patent: Aug. 18, 1998

[54] FUEL INJECTION CONTROL SYSTEM FOR IN-CYLINDER INJECTION INTERNAL COMBUSTION ENGINE

[75] Inventors: Hideyuki Oda; Kenji Goto; Nobuaki Murakami; Kazuchika Tashima; Hiroki Tamura, all of Tokyo, Japan

[73] Assignee: Mitsubishi Jidosha Kogyo Kabushiki Kaisha, Tokyo, Japan

[21] Appl. No.: 776,242

[22] PCT Filed: May 24, 1996

[86] PCT No.: PCT/JP96/01391

§ 371 Date: May 19, 1997

§ 102(e) Date: May 19, 1997

[87] PCT Pub. No.: WO96/37694

PCT Pub. Date: Nov. 28, 1996

[30] Foreign Application Priority Data

May 26, 1995 [JP] Japan ............................. 7-128681

[51] Int. Cl.[6] .................... F02B 3/02; F02D 41/06
[52] U.S. Cl. ............................ 123/305; 123/179.17
[58] Field of Search ........................ 123/305, 179.17

[56] References Cited

U.S. PATENT DOCUMENTS 5,127,378  7/1992  Ito ................................. 123/305
5,598,817  2/1997  Igarashi et al. ............... 123/179.17

FOREIGN PATENT DOCUMENTS

| U 59-65945 | 5/1984 | Japan . |
| A 62-237057 | 10/1987 | Japan . |
| A 223250 | 1/1990 | Japan . |
| U 51837 | 1/1993 | Japan . |
| A 5149168 | 6/1993 | Japan . |

*Primary Examiner*—Andrew M. Dolinar

[57] ABSTRACT

This invention relates to a fuel injection control system for an in-cylinder injection internal combustion engine. The system is provided with a fuel injection valve (1) arranged at a cylinder for injecting fuel into the cylinder, fuel feed pressure setting unit (121) for setting a fuel injection pressure of the fuel injection valve (1) at a low pressure in a specific operation state including a start-up of the internal combustion engine and for setting said fuel injection pressure at a high pressure in an operation state other than the specific operation state, and fuel injection controller (120) for setting an injection period of the fuel injection valve (1) as a period longer than a period of a single stroke in an operation cycle of the internal combustion engine in the specific operation state.

16 Claims, 20 Drawing Sheets

FUEL INJECTION CONTROL SYSTEM FOR IN-CYLINDER INJECTION INTERNAL COMBUSTION ENGINE

TECHNICAL FIELD

This invention relates to a fuel injection control system for an in-cylinder injection internal combustion engine, which system has been devised to improve low-temperature starting characteristics of the in-cylinder internal combustion engine.

BACKGROUND ART

As in-cylinder injection internal combustion engine of the type that fuel is injected directly into a cylinder, diesel engines are widely known. In recent years, the in-cylinder injection type is also available in gasoline engines.

To improve engine performance and reduce emission gas by in-cylinder injection internal engines, those constructed to perform a lean burn operation are furnished.

Fuel injection in such an in-cylinder engine is conducted at the timing shown in the diagram of FIG. 11.

Namely, during an ultra-lean operation, high-pressure fuel injection is performed by a high-pressure fuel pump at a predetermined timing in each compression stroke. During an operation other than such an ultra-lean operation, high-pressure fuel injection is performed by the high-pressure fuel pump at a predetermined timing in each intake stroke.

When an engine-driven pump is used as such a high-pressure fuel pump, no sufficient delivery pressure can be obtained at the time of a start-up of an internal combustion engine because the engine speed is low. To inject fuel at the time of a start-up, low-pressure fuel injection is therefore performed based on a delivery pressure from a low-pressure fuel pump.

When it is intended to achieve both high-pressure injection during an ordinary operation and low-pressure injection at the time of a start-up by a common injector as described above, accurate setting of a flow rate of fuel by the control of a valve-opening period of the injector is needed even when fuel is required in a small quantity under high pressure as in the case of an idling period after a shift to an ordinary operation. This requires to set an injection quantity gain (i.e., a degree of restriction) of the injector so that a low flow rate for an idling period or the like can be set in terms of a valve-opening period which is shortest in view of the responsibility of a solenoid of the injector. When an injection quantity gain suited for such a smallest flow rate is set for the injector, the injection quantity per unit time is limited accordingly. As a result, if fuel is injected at a low pressure as in the case of the time of a start-up, the injection quantity which varies corresponding to a pulse width is limited since the injection quantity per unit time is basically small due to the low-pressure injection. This may lead, for example, to the occurrence of a situation such that a desired injection quantity cannot be attained even if injection is performed during the entire period of an intake stroke as shown in FIG. 11.

Described more specifically, assume that the cranking speed is 100 rpm at low temperatures. The period of each intake stroke then becomes 300 ms, although the injection period required for the injection of fuel in a desired quantity is 420 ms or longer. The injection quantity is therefore considered to become insufficient.

This can also be understood from the diagram of FIG. 10.

In this diagram, against engine speeds plotted along the abscissa, feed air/fuel ratios or fuel injection pulse widths

2

Pw(ms) are plotted along the ordinate. A limit of fuel feeding is shown in a lower part, while a required injection period is indicated in an upper part.

According to the diagram, it is understood that at an engine speed of about 250 rpm or lower, the limit of fuel feeding falls short of the required air/fuel ratio and the fuel injection quantity becomes insufficient.

Describing this matter in a more practical sense, the quantity of fuel required for an engine becomes greater as the engine temperature typified by the coolant temperature or the like becomes lower. Further, the higher the engine speed, the shorter the period of each stroke. Accordingly, low-pressure injection at the time of a start-up may cause a situation such that an injection period within the period of a single stroke results in an insufficient injection quantity of fuel, for example, when cranking at very low temperatures or when the engine speed is increasing right after a start-up at a low temperature.

In the control of fuel injection for an incylinder injection internal combustion engine, it is the most important theme to ensure feeding of fuel in a quantity required by the engine in every combustion cycle. When the fuel quantity so required is met, the next important theme is at what time the required fuel quantity is fed into a cylinder. Namely, when a high gas mileage is pursued, it is preferred to inject fuel in the vicinity of a spark plug in a latter stage of a compression stroke so that the local air/fuel ratio near the spark plug can be controlled in a combustible state to permit stratified combustion with the overall air/fuel ratio maintained at an extremely high level. On the other hand, when fuel is required in a rather large quantity from the viewpoint of a higher output or accelerated warming-up, it is then preferred to feed fuel in a former stage of an intake stroke so that dispersion and atomization of the fuel within a combustion chamber can be promoted to create a state suited for pre-mixed combustion.

In an in-cylinder injection internal combustion engine which performs low-pressure injection at the time of a start-up, there is obviously such a case that the required fuel injection period falls within the period of a single stroke. This case arises when starting the engine while the temperature of the engine is high and right after such a start-up. In such a case, it may usually be contemplated to perform injection in an intake stroke. It then becomes necessary as a theme to study at which phase of this intake stroke the injection should be effected. In particular, if the timing of injection at the time of low-pressure injection and that at the time of high-pressure injection are substantially different from each other upon switching from start-up low-pressure injection to high-pressure injection after the start-up has been completed and the engine speed has increased, the state of atomization within a cylinder may rapidly change, resulting in a sudden drop in the engine speed. It is preferred to make it possible to cope with such a situation. Further, to cope with such a situation that a required fuel quantity cannot be met by an injection period within a single stroke (especially by low-pressure injection) as in the case of the time of a start-up at a low temperature, it is also an important theme in the injection control for an in-cylinder injection internal combustion engine to determine at what time the injection should be effected.

When the engine speed rapidly increases subsequent to a start-up, the time interval of each cranking stroke is suddenly shortened. It is also an important theme to set the timing of injection so that a fuel quantity required by the engine can be attained as much as possible even under such a situation. Further, it is also necessary as a secondary theme to economically provide an injector which can satisfy the respective requirements.

DISCLOSURE OF THE INVENTION

It is an object of the present invention to provide a fuel injection control system which assures good starting performance in an in-cylinder injection internal combustion engine, which conducts low-pressure injection at the time of a start-up, and which has high practical utility when applied to an automotive vehicle or the like.

In one aspect of the present invention, there is thus provided a fuel injection control system for an in-cylinder injection internal combustion engine. The system comprises: a fuel injection valve arranged at a cylinder for injecting fuel into the cylinder; fuel feed pressure setting means for setting a fuel injection pressure of the fuel injection valve at a low pressure in a specific operation state including a start-up of the internal combustion engine and setting the fuel injection pressure at a high pressure in an operation state other than the specific operation state; and fuel injection control means for setting an injection period of the fuel injection valve as a period longer than a period of a single stroke in an operation cycle of the internal combustion engine in the specific operation state. According to the above constitution, the control of fuel injection is performed so that at the time of low-pressure injection, an injection period longer than the period of a single stroke can be set. This ensures feeding of fuel in a quantity as much as needed. This fuel injection control has great significance especially in a system where an injector gain is set corresponding to setting of a small injection quantity at a high-pressure time.

Upon setting an injection period longer than the period of the single stroke, the fuel injection control means may set the injection period as a period ranging from an exhaust stroke to an intake stroke. In this case, it is preferred to primarily set the injection period in the intake stroke to the utmost from the viewpoint of avoiding release of unburnt fuel into an exhaust system. When an injection period longer than the period of a single stroke is set, it is therefore most preferred to set an injection ending time at a time around a starting time of a compression stroke.

In another aspect of the present invention, there is also provided a fuel injection control system for an in-cylinder injection internal combustion engine. The system comprises: a fuel injection valve arranged at a cylinder for injecting fuel into the cylinder; fuel feed pressure setting means for setting a fuel injection pressure of the fuel injection valve at a low pressure in a specific operation state including a start-up of the internal combustion engine and setting the fuel injection pressure at a high pressure in an operation state other than the specific operation state; and fuel injection control means for setting an injection period of the fuel injection valve in accordance with at least one engine operation parameter including an engine temperature in the specific operation state so that in a first operation state, the injection period becomes a period longer than a period of a single stroke in an operation cycle of the internal combustion engine and that in an operation state other than the first operation state, the injection period becomes a period not longer than the period of the single stroke. According to this constitution, at the time of low-pressure injection, the injection period is variably set in accordance with at least one operation parameter including the engine temperature. This injection period is set longer than the period of a single stroke at a certain time or shorter than the period of the single stroke at another certain time, so that fuel injection quantities at the time of a start-up and immediately after that time can be properly set.

Further, in addition to the above-described features, the injection period may be set so that injection of fuel is performed during a period ranging from an exhaust stroke to an intake stroke in the first operation state and that the injection is performed during the intake stroke in the operation state other than the first operation state. This feature makes it possible to effectively use the intake stroke which is most suited as an injection time at the time of a low-pressure injection.

In the above-mentioned constitution, the fuel injection control means may set an injection ending time of the fuel injection valve in the first operation state at a time around a starting time of a compression stroke and may set an injection starting time of the fuel injection valve in the operation state other than the first operation state at a time around a starting time of the intake stroke or at a time during the intake stroke. In this case, when the injection period at the time of the low-pressure injection is longer than the period of the single stroke, the injection ending time is set at a time around the starting time of the compression stroke. However, when the injection period at the time of the low-pressure injection is shorter than the period of the single stroke, the injection starting time is set at a time around the starting time of the intake stroke or in the intake stroke. Owing to this, when the injection period is relatively long, the whole period of the intake stroke and at least a part of the period of the exhaust stroke are used as an injection period, and, when the injection period is relatively short, injection is completed only in the intake stroke. Especially when the injection period is short relative to the period of the single stroke, it may be contemplated to always start injection from a time around the starting time of the intake stroke. As an alternative, it may also be contemplated to modify the injection starting time so that injection is started at a time later than the time around the starting time of the intake stroke when the injection period is short relative to the period of the single stroke and especially, when the injection period is relatively short and otherwise, is started from the time around the starting time of the intake stroke.

Preferably, in the operation state other than the first operation state, the fuel injection control means sets the injection ending time at a time around a preset phase set as an injection ending time for a high-pressure injection time within a former half of the intake stroke when injection of fuel is completed until the preset phase, and sets the injection starting time at a time around the starting time of the intake stroke when injection of fuel is not completed until the preset phase.

In this case, a change in output which take place by a change in combustion upon a change-over from low-pressure injection to high-pressure injection can be made smaller by setting the injection ending time at the preset phase when the injection period is short relative to the period of the single stroke and especially, when a required fuel quantity is met by ending the injection at the preset phase set as the injection ending time for the high-pressure injection time within the former half of the intake stroke or by setting the injection starting time at the time around the starting time of the intake stroke when the injection period is short relative to the period of the single stroke and when the injection of fuel is not completed until the preset phase.

In a further aspect of the present invention, there is also provided a fuel injection control system for an in-cylinder injection internal combustion engine. The system comprises: a fuel injection valve arranged at a cylinder for injecting fuel into the cylinder; fuel feed pressure setting means for setting a fuel injection pressure of the fuel injection valve at a low pressure in a specific operation state including a start-up of the internal combustion engine and for setting the fuel injection pressure at a high pressure in an operation state other than the specific operation state; and fuel injection control means for setting an injection period of the fuel injection valve in the specific operation state in accordance with at least one engine operation parameter including an engine temperature, and setting an injection starting time so that injection of fuel is started in an exhaust stroke and ended around a starting time of a compression stroke when the injection period is longer than the period of a single stroke in an operation cycle of the internal combustion engine and that the injection of fuel is performed in an intake stroke when the injection period is not longer than the period of the single stroke in the operation cycle of the internal combustion engine.

According to this constitution, the injection period at the time of the low-pressure injection is set in accordance with at least one operation parameter including the engine temperature, and exhaust-intake stroke injection or intake stroke injection is performed depending on the length of the injection period relative to the period of the stoke at the time of low-pressure injection. The fuel injection quantity and the starting time of fuel injection at the time of low-pressure injection can therefore be made appropriate.

In a still further aspect of the present invention, there is also provided a fuel injection control system for an in-cylinder injection internal combustion engine. The system comprises: a fuel injection valve arranged at a cylinder for injecting fuel into the cylinder; fuel feed pressure setting means for setting a fuel injection pressure of the fuel injection valve at a low pressure in a specific operation state including a start-up of the internal combustion engine and setting the fuel injection pressure at a high pressure in an operation state other than the specific operation state; and fuel injection control means for setting, in the specific operation state, an injection period of the fuel injection valve in accordance with at least one engine operation parameter including an engine temperature, and a fuel injection starting time in accordance with at least the engine temperature and an engine speed so that injection of fuel is performed during a period ranging from an exhaust stroke to an intake stroke or during the intake stroke, and wherein said fuel injection control means sets, in an operation period other than the specific operation state, said injection period in accordance with at least one engine operation parameter including an engine load, and the fuel injection starting time in accordance with at least the engine load and the engine speed so that injection of fuel is performed during the intake stroke or a compression stroke. According to this constitution, the injection starting time at the time of low pressure injection is set primarily in accordance with the engine temperature and the engine speed, while the injecting starting time at the time of high-pressure injection is set primarily in accordance with the engine load and the engine speed. This makes it possible to properly set the injection starting time in correspondence to the injection period at the time of low-pressure injection, said injection period having high temperature-dependency, or the injection period at the time of high-pressure injection, said injection period having high load-dependency.

In a still further aspect of the present invention, there is also provided a fuel injection control system for an in-cylinder injection internal combustion engine. The system comprises: a fuel injection valve arranged at a cylinder for injecting fuel into the cylinder; fuel feed pressure setting means for setting a fuel injection pressure of the fuel injection valve at a low pressure in a specific operation state including a start-up of the internal combustion engine and setting the fuel injection pressure at a high pressure in an operation state other than the specific operation state; and fuel injection control means for setting an injection period of the fuel injection valve in accordance with at least one engine operation parameter including an engine temperature so that the injection period is extended as the engine temperature becomes lower, and setting, at the time of a start-up at a low temperature, an injection starting time of the fuel injection valve so that injection of fuel is started in an exhaust stroke and is ended by a phase close to a starting time of a compression stroke. According to this constitution, the injection period is set as a period ranging from a time point in the exhaust stroke to the time around the starting time of the compression stroke at the time of the low-temperature start-up and low-pressure injection where the injection period is set long. The fuel injection quantity and the starting time of fuel injection at the time of a low-temperature start-up where low-pressure injection is performed can therefore be made appropriate.

In a still further aspect of the present invention, there is also provided a fuel injection control system for an in-cylinder injection internal combustion engine. The system comprises: a fuel injection valve arranged at a cylinder for injecting fuel into the cylinder; fuel feed pressure setting means for setting a fuel injection pressure of the fuel injection valve at a low pressure in a specific operation state including a start-up of the internal combustion engine and setting the fuel injection pressure at a high pressure in an operation state other than the specific operation state; and fuel injection control means for setting an injection ending time of the fuel injection valve so that the injection ending time in the specific operation state substantially equals to an injection ending time in an operation state other than the specific operation state immediately after a change-over from the specific operation state to the operation state other than the specific operation state. According to this constitution, injection of fuel is controlled so that the injection ending time at the time of low-pressure injection becomes substantially close to the injection ending time for the period immediately after the change-over to high-pressure injection.

In the above constitution, the injection ending time immediately after the change-over may be set at a preset phase during a former half of an intake stroke, and the fuel injection control means may set the injection ending time at a time around the preset phase when the injection period in the specific operation state is shorter than a stroke period from a time around a starting time of the intake stroke to the preset phase, and may delay the injection ending time beyond the preset phase when the injection period in the specific operation state is longer than the stroke period. According to this constitution, the injection starting time can be rendered appropriate by making the injection ending time at the time of low-pressure injection equal to the injection ending time in the period immediately after the change-over to the high-pressure injection in the relatively short injection period at the time of low-pressure injection and by delaying the injection ending time when the injection period at the time of low-pressure injection is relatively long.

In a still further aspect of the present invention, there is also provided A fuel injection control system for an in-cylinder injection internal combustion engine. The system comprises: a fuel injection valve arranged at a cylinder for injecting fuel into the cylinder; fuel feed pressure setting means for setting a fuel injection pressure of the fuel injection valve at a low pressure in a specific operation state including a start-up of the internal combustion engine and setting the fuel injection pressure at a high pressure in an operation state other than the specific operation state; and fuel injection control means for setting, in the specific operation state, an injection starting time of the fuel injection valve so that injection of fuel is ended before a starting time of a compression stroke, setting, in an operation state other than the specific operation state, the injection starting time in accordance with at least one operation parameter including an engine load so that injection of fuel is performed in an intake stroke or the compression stroke, and setting, immediately after a change-over from the specific operation state to the operation state other than the specific operation sate, the injection starting time so that injection of fuel is performed in the intake stroke. According to this constitution, in the period immediately after the change-over from low-pressure injection to high-pressure injection, intake-stroke injection is performed as in the time of low-pressure injection. This makes it possible to reduce a change in the state of combustion between before and after the change-over, so that a smooth change in output is feasible upon changing the fuel pressure.

In the above constitution, the fuel injection control means may control the fuel injection valve so that in the specific operation state, injection of fuel is started at a time around a starting time of an intake stroke or before the time around the starting time of the intake stroke. According to this feature, at the time of low-pressure injection, the fuel injection valve is controlled to start injection of fuel at a time around the starting time of the intake stroke or before the time around the starting time of the intake stroke. The possible problem of an insufficient injection period at the time of low-pressure injection can be lessened.

In a still further aspect of the present invention, there is also provided a fuel injection control system for an in-cylinder injection internal combustion engine. The system comprises: a fuel injection valve arranged at a cylinder for injecting fuel into the cylinder; fuel feed pressure setting means for setting a fuel injection pressure of the fuel injection valve at a low pressure in a specific operation state including a start-up of the internal combustion engine and setting the fuel injection pressure at a high pressure in an operation state other than the specific operation state; signal generating means for generating a first trigger signal and a second trigger signal at a time around a starting time of an intake stroke and at a time during a specific stroke phase before the time around the starting time of the intake stroke, respectively, in relation to the cylinder; and fuel injection control means for computing a fuel injection starting time of the fuel injection valve coincidently with generation of the second trigger signal so that the injection starting time of the fuel injection valve becomes a desired time within a period ranging from an exhaust stroke to an intake stroke, measuring an elapsed time period from the generation of the second trigger signal to control valve-opening drive of the fuel injection valve so that the fuel injection valve is opened at the desired time, and, when the fuel injection valve is not open at the time of generation of the first trigger signal, opening the fuel injection valve in preference to the results of the measurement.

According to this constitution, at the time of low-pressure injection, the starting time of fuel injection is computed before the intake stroke, for example, at a time around the starting time of the exhaust stroke so that the injection valve can be opened at the desired time within the period ranging from the exhaust stroke to the intake stroke. When injection is not started at a time around the starting time of the intake stroke, injection is forcedly started. Therefore, the injection of fuel is started at a time around the starting time of the intake stroke even at the time of low-pressure injection where the injection of fuel is most delayed. Even when an abrupt increase in engine speed or the like takes place subsequently, a necessary fuel injection period is therefore assured so that an actual fuel quantity can be made close to a required fuel quantity.

In the above constitution, the internal combustion engine may be provided with 4N (N: natural number) cylinders, and the second trigger signal for a particular one of the cylinders may be formed commonly with the first trigger signal for another one of the cylinders. According to this constitution, for a internal combustion engine having cylinders as many as a multiple of 4 (including a 4-cylinder internal combustion engine), a pulser for generating a trigger signal to specify a time point for computing a fuel injection starting time and a pulser for generating a trigger signal to forcedly start injection of fuel can be used commonly among the individual cylinders. This makes it possible to economically form the system.

In a still further aspect of the present invention, there is also provided a fuel injection control system for an in-cylinder injection internal combustion engine. The system comprises: a fuel injection valve arranged at a cylinder for injecting fuel into the cylinder; fuel feed pressure setting means for setting a fuel injection pressure of the fuel injection valve at a low pressure in a specific operation state including a start-up of the internal combustion engine and setting the fuel injection pressure at a high pressure in an operation state other than the specific operation state; and fuel injection setting means for setting an injection starting time of the fuel injection valve at a time around a starting time of an intake stroke or in an exhaust stroke. According to this construction, at the time of low-pressure injection where compression-stroke injection is not suited, the fuel injection starting time is set at a time around of the starting time of the intake stroke or in the exhaust stroke. Therefore, the injection period at the time of low-pressure injection— said injection period being not suited for compression-stroke injection, involving a limitation in assuring a necessary injection period and from the viewpoint of surely providing a required fuel quantity because of low-pressure injection, requiring a longer injection period—can be extended to the utmost. It is therefore possible to make the injection quantity of fuel, which can be supplied into the cylinder, close to a required injection quantity to the utmost.

Figure 2:
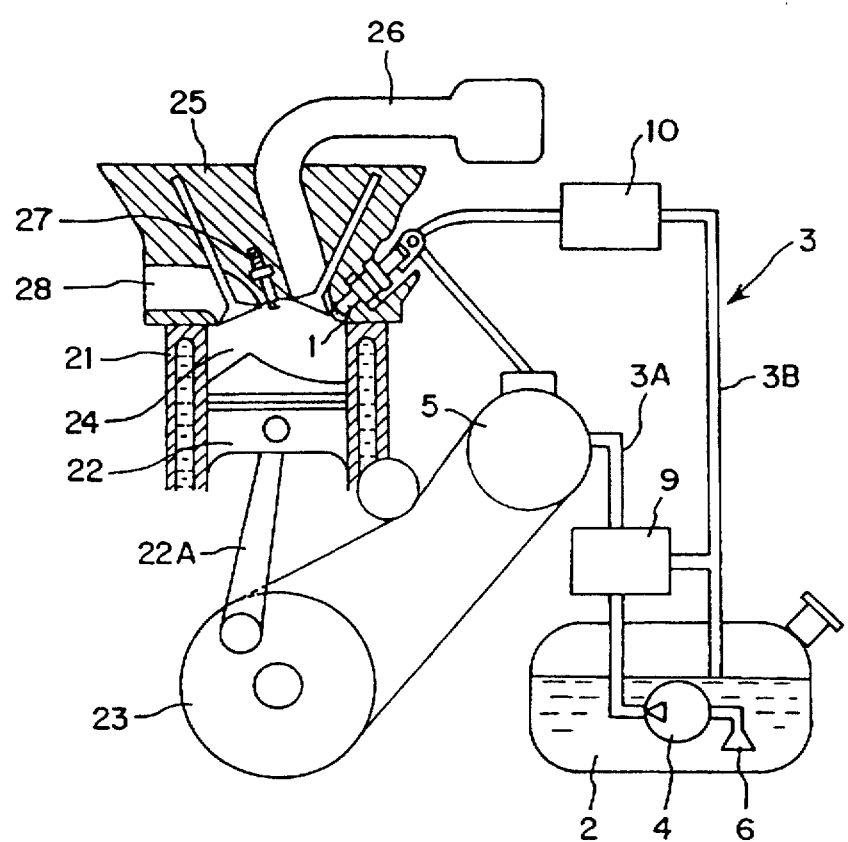
FIG. 2 is a schematic view illustrating the hardware construction of an essential part of the fuel injection control system according to the first embodiment of this invention for the in-cylinder injection internal combustion engine.
Figure 3:
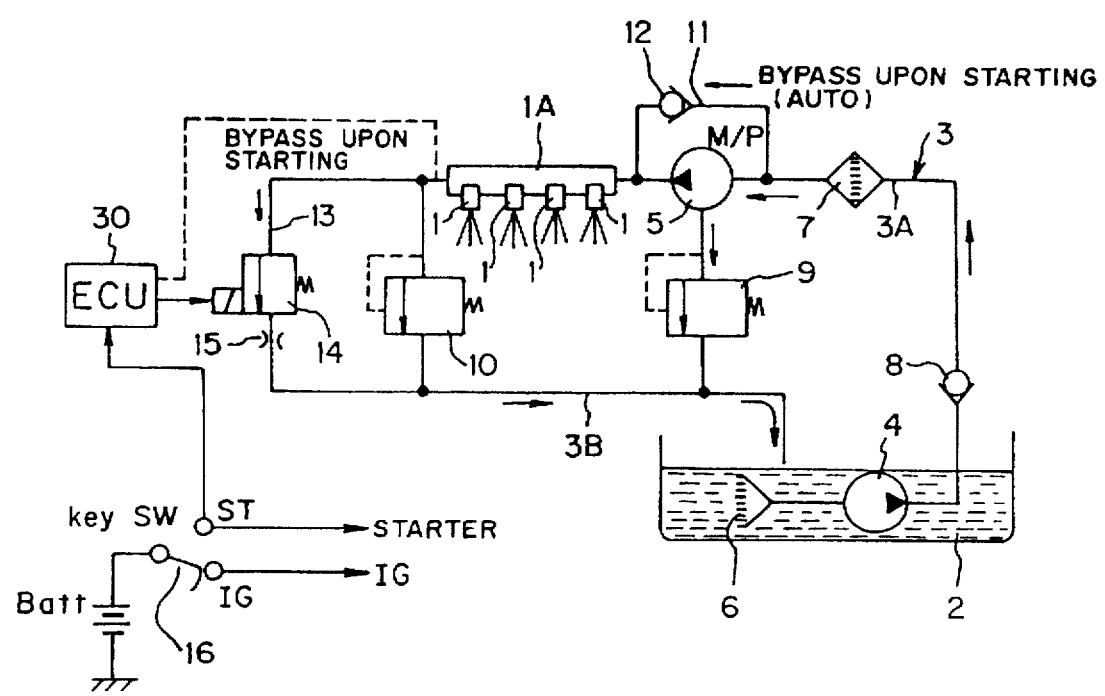
FIG. 3 is a schematic diagram of a fuel system in the fuel injection control system according to the first embodiment of this invention for the in-cylinder injection internal combustion engine.

BEST MODE FOR CARRYING OUT THE INVENTION (a) Description of the First Embodiment First, the system according to this embodiment is arranged in a 4-cycle gasoline engine as an internal combustion engine, especially in an in-cylinder injection gasoline engine such as that shown in FIG. 2 and FIG. 3. In these drawings, there are illustrated fuel injection valves 1, a fuel tank 2, a fuel line 3 arranged between the fuel injection valves 1 and the fuel tank 2, a low-pressure fuel pump 4 disposed in the fuel line 3 at an upstream point thereof on a side of the fuel tank 2, and a high-pressure fuel pump 5 arranged between the low-pressure fuel pump and the fuel injection valves 1. Also illustrated are fuel filters 6,7 arranged at an inlet and an intermediate point of the fuel line respectively, a check valve 8, a low-pressure control valve 9 as low-pressure control means, and a high-pressure control valve 10 as high-pressure control means. There are also depicted a cylinder 21, a piston 22, a piston rod 22A, a crankshaft 23, a combustion chamber 24, a cylinder head 25, an intake passage 26, a spark plug 27, and an exhaust passage 28.

Namely, the low-pressure fuel pump (feed pump) 4 and the high-pressure fuel pump 5 are arranged in the fuel line 3 which communicates the fuel injection valves (injectors) 1 and the fuel tank 2 with each other.

The fuel line 3 is constructed of a supply line 3A for supplying fuel from the fuel tank 2 to the fuel injection valves 1 and a return line 3B for returning to the fuel tank 2 the fuel not injected through the fuel injector valves 1.

Further, the fuel injection valves 1 are supplied with fuel through a delivery pipe 1A. In this embodiment, the delivery pipe 1A itself constitutes a part of the fuel line 3.

The fuel injection valves 1 are computercontrolled in operation by a controller 30. In accordance with information such as an engine speed and an inducted air quantity, the controller 30 energizes the fuel injection valves 1 by pulse currents at a prescribed timing so that a prescribed fuel injection quantity is obtained. In this manner, injection of fuel is performed.

The timing of fuel injection is indicated based on a crank angle as will be described subsequently herein. In practice, there is a response lag (which is called an "injector dead time") until injection of fuel is actually performed subsequent to energization of each fuel injection valve 1. The timing of fuel injection is therefore set while taking the injector dead time into consideration.

A fuel injection quantity is set by a pulse width Pw of the above pulse current. This pulse width Pw is read, from a map stored in advance, as an injector gain corresponding to a target fuel injection quantity and is then set.

In such a fuel supply system, fuel which has been pressurized to a certain extent by the low-pressure fuel pump 4 is pressurized further by the high-pressure fuel pump 5, whereby the pressure of the fuel is raised to a predetermined level. In this regard, the fuel supply system is constructed so that the delivery pressure from the low-pressure fuel pump 4 is controlled within a predetermined range by the low-pressure control valve 9 and the delivery pressure from the high-pressure fuel pump 5 is controlled within a predetermined range by the high-pressure control valve 10.

As a technique for supplying fuel to fuel injection valves subsequent to further pressurization of fuel, which has been pressurized by a low-pressure fuel pump, by a high-pressure pump fuel as described above, there is, for example, the technique disclosed in Japanese Patent Application Laid-Open (Kokai) No. SHO 62-237057. According to this technique, it is designed to reduce a load on a high-pressure fuel pump by producing a high fuel injection pressure in an operation range where the pressure of inducted air is high but maintaining the fuel injection pressure low in an operation range where the pressure of inducted air is low.

As such fuel pumps, it may be contemplated to adopt either engine-driven pumps or electrically-driven pumps. Adoption of an electrically-driven pump as a high-pressure pump, however, results in a low pump efficiency and also in a high cost. Therefore, the high-pressure pump 5 is composed of an engine-driven pump while the low-pressure pump 4 is composed of an electrically-driven pump.

Incidentally, the low-pressure fuel pump 4 is arranged so that when operated, it causes fuel to flow from the fuel tank 2 toward a downstream side of the supply line 3A while filtering the fuel through the fuel filter 6. Pressurization of the fuel by the low pressure fuel pump 4 at this time is designed to raise the pressure of the fuel from the level of the atmospheric pressure to several atm or so.

The high-pressure pump 5 serves pressurize to the fuel which has been delivered from the low-pressure fuel pump 4, to several tens atm or so. At intermediate points of the supply line 3A between the low-pressure fuel pump 4 and the high-pressure fuel pump 5, the check valve 8 and the fuel filter 7 are interposed, respectively, whereby the delivery pressure from the low-pressure fuel pump 4 is maintained by the check valve 8 and the fuel is filtered further by the fuel filter 7. As the high-pressure fuel pump 5, a pump of the engine-driven type (hereinafter called the "engine-driven pump") which is more advantageous as a high-pressure pump than an electrically-driven pump in pump efficiency and cost is used. Obviously, the high-pressure fuel pump 5 is operated directly in association with an operation of the engine, and produces a delivery pressure in correspondence to an engine speed.

Figure 4:
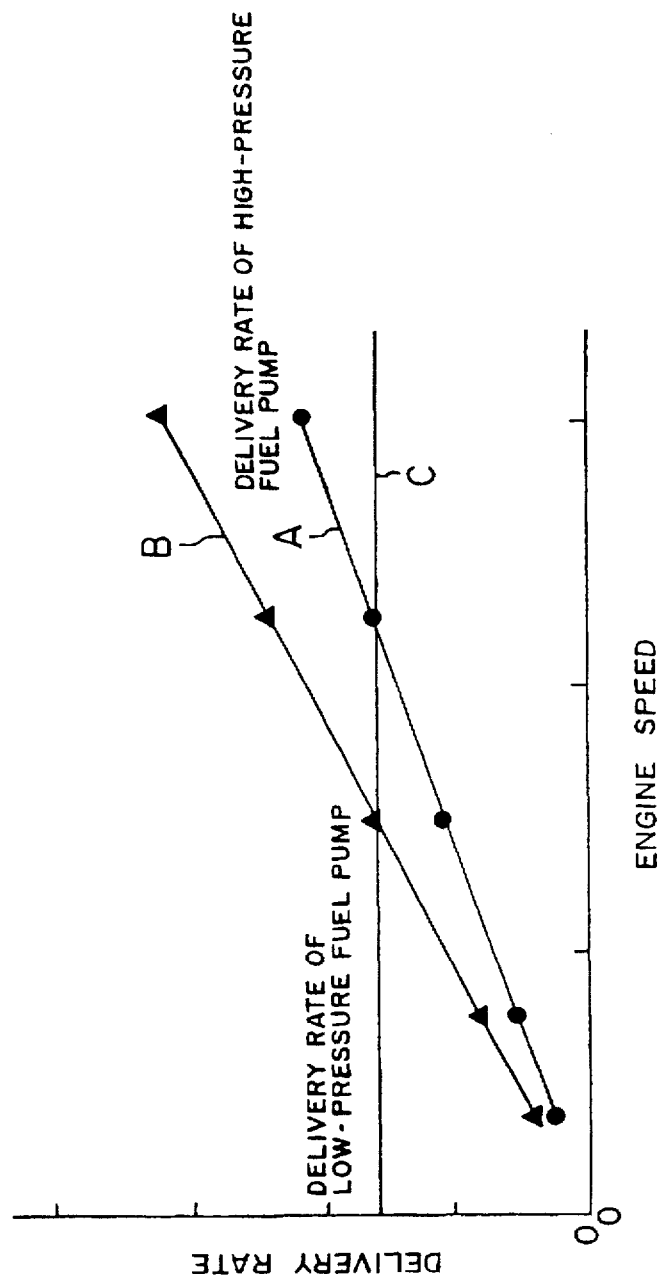
FIG. 4 is a graph showing output (delivery flow rate) characteristics of a fuel pump in the fuel injection control system according to the first embodiment of this invention for the in-cylinder injection internal combustion engine.

FIG. 4 shows illustrative output characteristics (delivery flow rates) of the fuel pumps 4,5 under conditions that their delivery pressures are maintained constant. Straight lines A,B indicate delivery flow rate characteristics of the high-pressure fuel pump 5, while a straight line C shows delivery flow rate characteristics of the low-pressure fuel pump 4. The straight lines A,B represent setting of different cam lifts for the drive of the high-pressure fuel pump 5. In the case of the straight line B, the cam lift is greater and the pump output is higher, compared with the case of the straight line A. The delivery flow rate characteristics cannot be read directly as "delivery pressure characteristics", because actual delivery pressures of the fuel pumps 4,5 are determined by flow resistances of the low-pressure control valve 9 as low-pressure control means, the high-pressure control valve 10 as high-pressure control means, and the like. These control valves will be described subsequently herein. However, delivery pressure characteristics substantially correspond to these delivery flow rate characteristics. The fuel supply system is therefore constructed so that the low-pressure fuel pump 4 produces a predetermined delivery pressure (delivery flow rate) while the high-pressure fuel pump 5 of the engine-driven type produces a delivery pressure (delivery flow rate) in proportion to an engine speed.

In the fuel line 3, the pressure control valve (low-pressure regulator) 9 which serves to regulate a delivery pressure of the low-pressure fuel pump 4 to a preset pressure (for example, 3 atm) is arranged between a section of the supply line 3A, said section being on a side upstream the high-pressure fuel pump 5, and a most downstream section of the return line 3B. This low-pressure control valve 9 remains closed until the delivery pressure from the low-pressure fuel pump 4 exceeds the preset pressure but, when the delivery pressure exceeds the preset pressure, opens to such an extent as needed to shunt and return fuel in a quantity corresponding to the extra pressure to a side of the fuel tank 2. The low-pressure control valve 9 is therefore constructed to regulate the pressure of fuel, which is to be supplied to the high-pressure fuel pump 5, around the preset pressure.

Arranged between a line section immediately downstream the fuel injection valves 1 and the return line 3B is the high-pressure control valve (high-pressure regulator) 10 which regulates a delivery pressure from the high-pressure fuel pump 5 to a preset pressure (for example, 50 atm). This high-pressure control valve 10 remains closed until the delivery pressure from the high-pressure fuel pump 5 exceeds the preset pressure (for example, 50 atm) but, when the delivery pressure exceeds the preset pressure, opens to such an extent as needed to return fuel in a quantity corresponding to the extra pressure to the side of the fuel tank 2. The high-pressure control valve 10 is therefore constructed to regulate the pressure of fuel to a predetermined pressure at the fuel injection valves 1.

Further, to make it possible to supply fuel from the supply line 3A to the fuel injection valves 1 by circumventing the high-pressure fuel pump 5, a bypass line (hereinafter called the "first bypass line") 11 is arranged to connect a section of the supply line 3A, said section being on an upstream side of the high-pressure fuel pump 5, and another section of the supply line 3A, the section being on a downstream side of the high-pressure fuel pump 5. This first bypass line 11 is provided with a check valve 12 which allows fuel to flow therethrough only from an upstream side toward a downstream side of the supply line 3A. This check valve 12 is arranged to prevent the fuel from flowing backward from the downstream side toward the upstream side of the fuel pump 5 when the high-pressure pump 5 does not operate fully.

To permit discharge of fuel from an area of the fuel injection valves 1 toward the side of the fuel tank 2 while circumventing the high-pressure control valve 10, a bypass line (hereinafter called the "second bypass line") 13 is also arranged connecting a section of the return line 3B, the section being on a side up-stream the high-pressure control valve 10, a section of the return line 3B, the section being on a side downstream the high-pressure control valve 10, with each other. This second bypass line 13 is arranged to discharge in an initial stage of a start-up of the engine vapor (bubbles) contained in the fuel line 3 at a location near the fuel injection valves 1 and also to set the fuel pressure in the area of the fuel injection valve 1 at a predetermined low value in a specific operation state. The second bypass line 13 is provided with the electromagnetic directional control valve 14 for opening or closing the second bypass line 13 and a fuel pressure holding device 15 for holding the fuel pressure at a predetermined pressure in the area of the fuel injection valves 1.

Namely, the electromagnetic directional control valve 14 is designed to keep the second bypass line 13 opened under energization but to keep the second bypass line 13 closed while not energized. The open/closure of the electromagnetic directional control valve 14 is controlled by the controller 30.

The controller 30 is designed to control the electromagnetic directional control valve 14 so that the electromagnetic directional control valve 14 remains open in the specific operation state but remains closed in an ordinary operation state. The term "specific operation state" as used herein means an operation state at the time of a start-up of the engine, that is, an operation state in which an ignition switch 16 is at a start position and the engine speed is lower than a speed set for a start-up and also an operation state immediately after the start-up, that is, an operation state until the engine speed exceeds the speed set for the start-up and also the high-pressure fuel pump 5 becomes possible to perform a full operation.

Accordingly, the ordinary operation state corresponds to a state in which the high-pressure fuel pump 5 has become possible to perform the full operation. It is to be noted that the electromagnetic directional control valve 14 is closed when a time elapsed since setting of the ignition switch 16 at the start position until attainment of this ordinary to operation state has exceeded a predetermined time required for the elimination of vapor or while the engine is out of operation.

Described specifically, the controller 30 receives signals from the ignition switch 16 and an engine speed sensor (not illustrated). The controller 30 is constructed so that the electromagnetic directional control valve 14 is supplied with energizing electric power to open the second bypass line 13 when the ignition switch 16 is at the start position and the engine speed has exceeded a stalling speed Nes (<100 rpm) but the supply of electric power to the electromagnetic directional control valve 14 is cut off to has exceeded a preset speed higher than a start-up speed Nst |Nes<Nst<Nid (idling speed)] for setting a start-up mode and a predetermined time has elapsed. Further, the supply of electric power to the electromagnetic directional control valve 14 is also cut off to close the second bypass line 13 when the engine is stalled and the engine speed has become equal to or lower than the stalling speed Nes or when the ignition switch 16 is turned off and the engine is rendered out of operation.

The electromagnetic directional control valve 14 is maintained open for a predetermined time or longer responsive to a start-up of the engine, whereby fuel vapor is eliminated from the delivery pipe 1A.

At the controller 30, the drive control of the fuel injection valves 1 is performed as described above. This control is associated with the open/close control of the second bypass line 13, so that the drive control of the fuel injection vales 1 is performed in a specific operation mode in the specific operation state (namely, at the time of the above-mentioned start-up of the engine) but in an ordinary operation mode in the ordinary operation state (namely, after the above-mentioned start-up of the engine).

Namely, the fuel pressure is changed by opening or closing the electromagnetic directional control valve 14 between the specific operation mode and the ordinary operation mode so that the fuel pressure takes a low-pressure value corresponding to the low-pressure control valve when the electromagnetic directional control valve 14 is opened but takes a high-pressure value corresponding to the high-pressure control valve when the electromagnetic directional control valve 14 is closed.

A fuel injection quantity, on the other hand, is determined by a fuel pressure and an injection period. Even if the injection period is constant, a higher fuel pressure results in a greater fuel injection quantity. Further, the injection dead time varies depending on a battery voltage and is also known to vary depending on a fuel pressure.

The injection period, namely, the injector gain, which determines the above-mentioned pulse width, and the injector dead time are set in different modes so that they are set in high-pressure modes (i.e., ordinary operation modes) when the fuel pressure is high but set in low-pressure modes (i.e., specific operation modes) when the fuel pressure is low.

By the way, the fuel pressure holding device 15 is arranged to obtain at least a fuel pressure close to a preset pressure controlled by the low-pressure control valve 9 even when the second bypass line 13 is open in a period immediately after a start-up of the engine. In this embodiment, a fixed restrictor which reduces the inner diameter of the fuel line 3 is disposed as the fuel pressure holding device 15.

Figure 6:
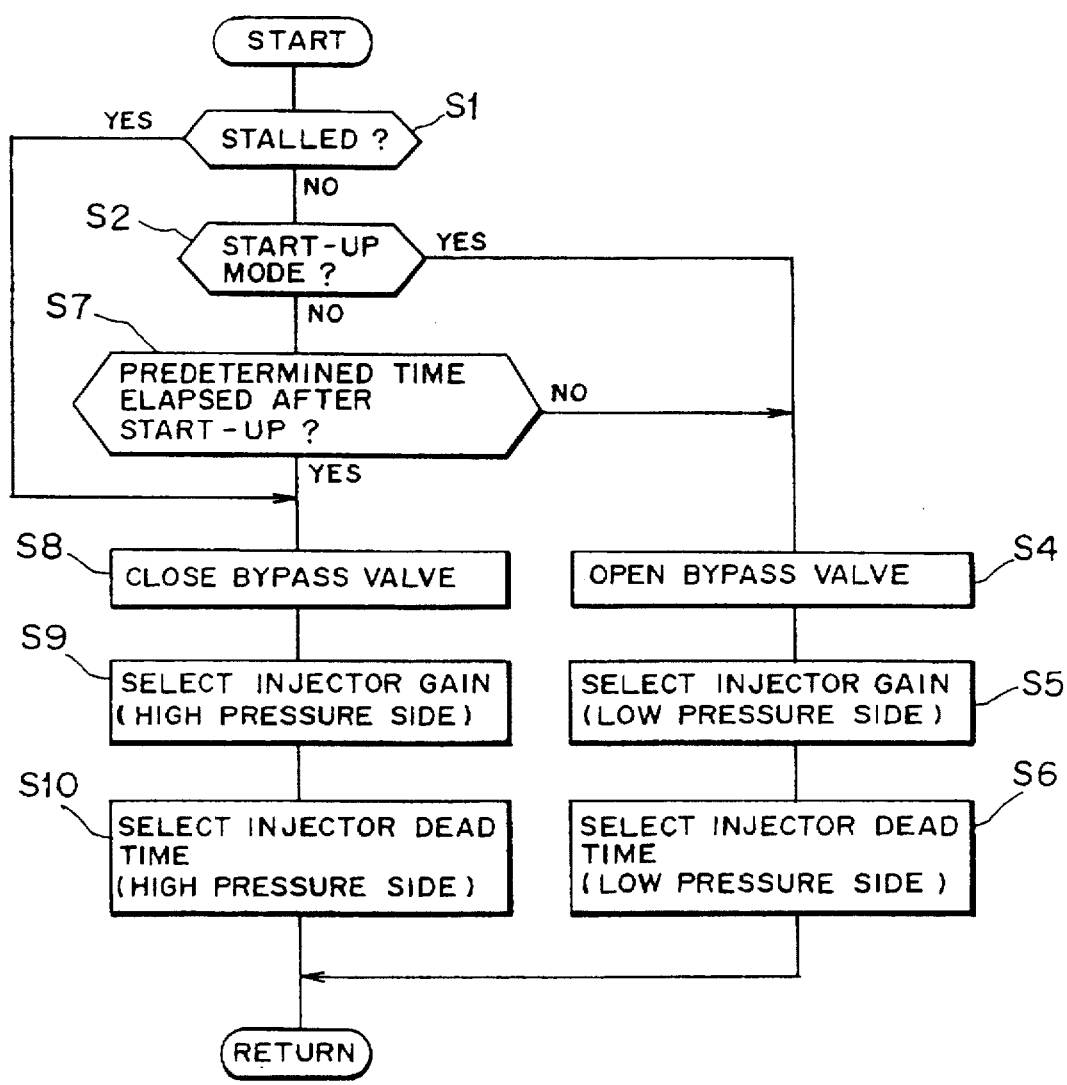
FIG. 6 is a flow chart illustrating operations of the fuel injection control system according to the first embodiment of this invention for the in-cylinder injection internal combustion engine.

The fuel supply system for the internal combustion engine, which is arranged in this embodiment, is constructed as described above, and control of fuel supply is performed by procedures such as those shown in FIG. 6.

First, it is determined whether the engine is in a stalled state (step S1). Unless the engine is in a stalled state, it is then determined whether the engine is in a start-up mode (step S2). If the engine is not in the start-up mode, it is, then, determined whether the engine is in an operation state permitting a full operation of the high-pressure fuel pump 5 (step 7). If the engine is in the start-up mode or the operation of the high-pressure pump 5 is not full (for example, a transient state in which the engine speed has not reached a predetermined speed after a start-up, which is determined, for example, by using as a parameter an engine speed, a time elapsed after completion of a start-up or a time elapsed after the engine speed reached a preset speed), the controller 30 opens the electromagnetic directional control valve 14 (step S4) so that the fuel injection valves 1 are driven and controlled in a specific operation mode.

Accordingly, the drive control is performed by selecting the injector gain for the low-pressure mode (step S5) and also selecting the injector dead time for the low-pressure mode (step 6).

Figure 5:
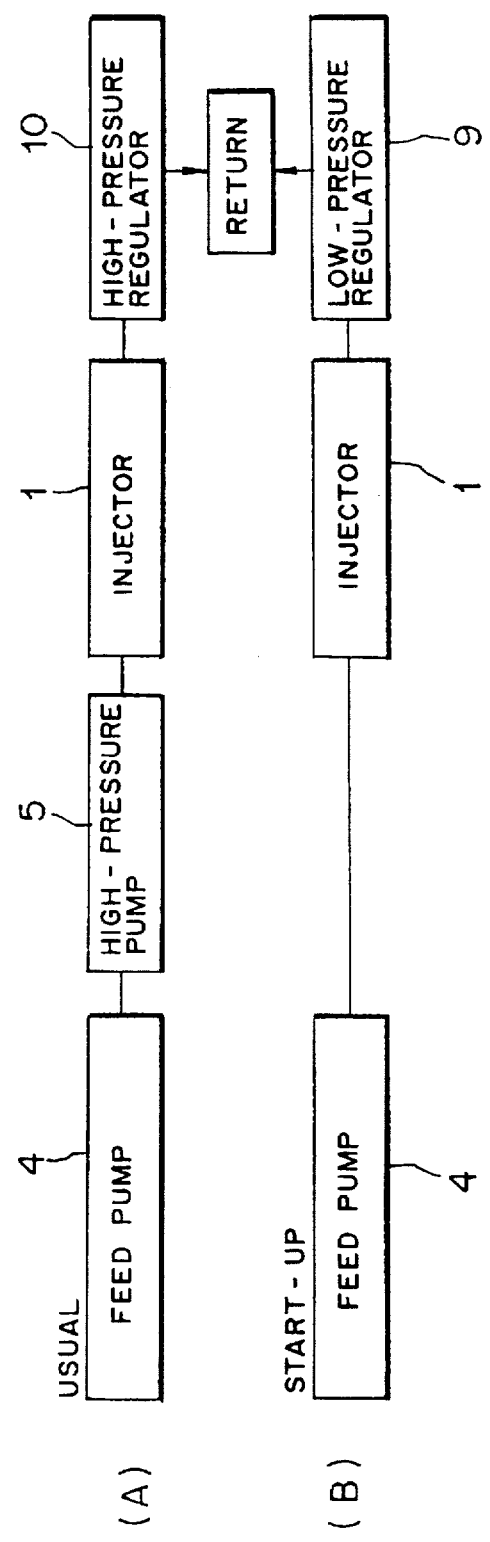
FIG. 5(A) and (B) are, in combination, a block diagram illustrating operations of the fuel injection control system according to the first embodiment of this invention for the in-cylinder injection internal combustion engine.

In this state, as is illustrated under (B) in FIG. 5, the fuel, which has been delivered from the low-pressure fuel pump (feed pump) 4 and regulated to a predetermined low-pressure value by the low-pressure control valve (low-pressure regulator) 9 arranged downstream the low-pressure fuel pump 4, is supplied to the fuel injection valves (injectors) 1 and any surplus portion of the fuel is returned to the fuel tank.

At this time, the low-pressure fuel pump 4 assumes promptly after a start-up of the engine a state in which it delivers the fuel at a predetermined pressure (several atm). No sufficient delivery pressure is, however, produced by the high-pressure pump 5 because the engine speed does not increase in a period immediately after the start-up of the engine.

Immediately after the start-up of the engine, the fuel is hence supplied toward the fuel injection valves 1 through the first bypass line 11 which is arranged in parallel with the high-pressure fuel pump 5. Accordingly, through the fuel injection valves 1, the fuel is injected at a fuel pressure approximately equal to a pressure set by the low-pressure control valve 9.

This takes place, because the check valve 12 in the first bypass line 11 is brought into an open state when the fuel pressure is lower on the downstream side of the high-pressure pump 5 than on the upstream side of the same pump.

On the other hand, actuation of the fuel supply system causes the electromagnetic directional control valve 14 to be opened so that the fuel is allowed to flow through the fuel line 3. Vapor which exists around the fuel injection valve 1 is therefore successively discharged together with the fuel which is flowing through the return line 3B of the fuel line 3.

Even if the second bypass line 13 is open as described above, the fixed restrictor as a fuel pressure holding device holds the fuel pressure around the fuel injection valves 1 at a level at least close to a pressure controlled and set by the low-pressure control valve 9. The fuel injection pressure through the fuel injection valves 1 can be maintained approximately at a level required at the time of a start-up of the engine, although vapor is being discharged.

It is, therefore, possible to obtain a certain degree of fuel injection pressure while avoiding a problem— such as a delay or variation in the rise of fuel pressure, false injection or the like—which arises due to vapor immediately after a start-up of the engine. This makes it possible to smoothly increase the engine speed while maintaining good combustion from shortly after a start-up of the engine, thereby substantially improving the practical utility of in-cylinder injection engines.

When vapor has been discharged as described above and the high-pressure fuel pump 5 begins to operate to a certain extent, a predetermined time is elapsed substantially in unison with the operation of the high-pressure fuel pump 5. The routine, therefore, advances from Step S7 along the "YES" route, whereby Step S8 onwards are performed.

In Step S8 onwards, the controller 30 closes the electromagnetic directional control valve 14 and also drives and controls the fuel injection valves 1 in the ordinary operation mode.

Namely, the injector gain for the high-pressure mode is selected (step S9) and the injector dead time for the high-pressure mode is selected (step S10).

Thereafter, subsequent to the determinations in steps S1,S2, and Step S7, operations of Steps S8 to S10 are continued until the engine stops.

As a result, as is illustrated under (A) in FIG. 5, the fuel delivered from the low-pressure fuel pump (feed pump) 4 is pressurized to a high pressure at the high-pressure fuel pump 12, regulated to a predetermined high pressure value at the high-pressure control valve (high-pressure regulator) 10, and then supplied to the fuel injection valves (injector) 1. Any surplus portion of the fuel is returned to the fuel tank.

As a consequence, the delivery pressure of the high-pressure fuel pump 5 progressively raises the fuel pressure on the downstream side of the high-pressure fuel pump 5 without a loss, so that the fuel pressure is raised to the regulation pressure of the high-pressure control valve 10 or higher. Further, the injector gain for the high-pressure mode and the injector dead time for the high-pressure mode are selected and as a result, the delivery pressure of the high-pressure fuel pump 5 rises to a sufficient level, so that the fuel whose pressure has been regulated by the high-pressure control valve 10 is injected through the fuel injection valves 1.

Figure 1:
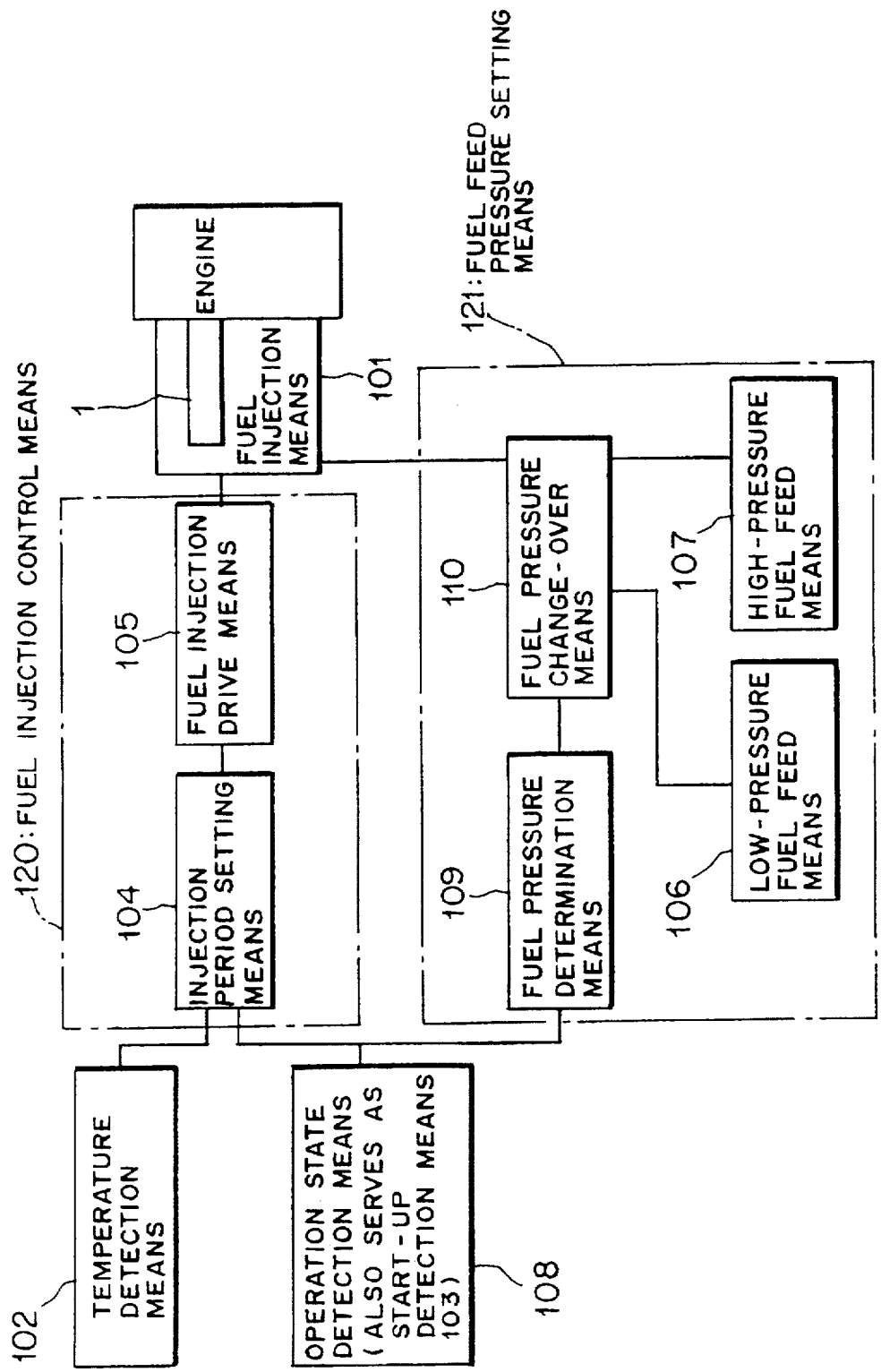
FIG. 1 is a principle block diagram showing an essential constitution of a fuel injection control system according to a first embodiment of this invention for an in-cylinder injection internal combustion engine.

Concerning the fuel injection control, various means are arranged to perform necessary control by a constitution such as that illustrated in FIG. 1. Accordingly, the fuel injection valves 1 are controlled so that the fuel injection is controlled as needed.

Namely, in a gasoline engine as a 4-cycle in-cylinder injection internal combustion engine in which fuel is successively injected into combustion chambers 24 of plural cylinders, each cylinder is provided with its own fuel injection means 101 to inject fuel into the cylinder. The fuel injection means 101 is provided with the above-mentioned fuel injection valve 1 and the fuel supply system to the fuel injection valve 1.

Also arranged are temperature detection means 102 for detecting a temperature of the internal combustion engine and start-up detection means 103 for detecting a start-up of the internal combustion engine. Injection period setting means 104 is also arranged, which sets an injection period of fuel in accordance with outputs of these temperature detection means 102 and start-up detection means 103.

The injection period setting means 104 is arranged in the above-mentioned controller (control means) 30. Also arranged is fuel injection drive means 105 for driving the fuel injection means 101 in response to an output of the injection period setting means 104, whereby each fuel injection valve 1 is opened or closed at a timing required by the results of calculation at the controller (control means) 30 so that fuel injection control optimal in the operation state is performed. Further, the injection period setting means 104 and the fuel injection drive means 105 make up fuel injection control means 120.

The injection period setting means 104 is constructed so that a fuel injection period is set as a long period extending over two strokes when the temperature of the internal combustion engine is detected to be lower than a predetermined temperature by the temperature detection means 102 and a start-up of the internal combustion engine is detected by the start-up detection means 103. The injection period setting means 104 is also constructed so that a fuel injection period is set as a short period in a single stroke when the temperature of the internal combustion engine is detected to be higher than the predetermined temperature by the temperature detection means 102 and the internal combustion engine is not in the state of a start-up by the start-up detection means 103. These operations are achieved by operations along the flow chart of FIG. 8.

Further, the above-described long period is formed of substantially the entire period of an intake stroke and a part of an exhaust stroke. Its calculation is conducted as will be described below.

Figure 7:
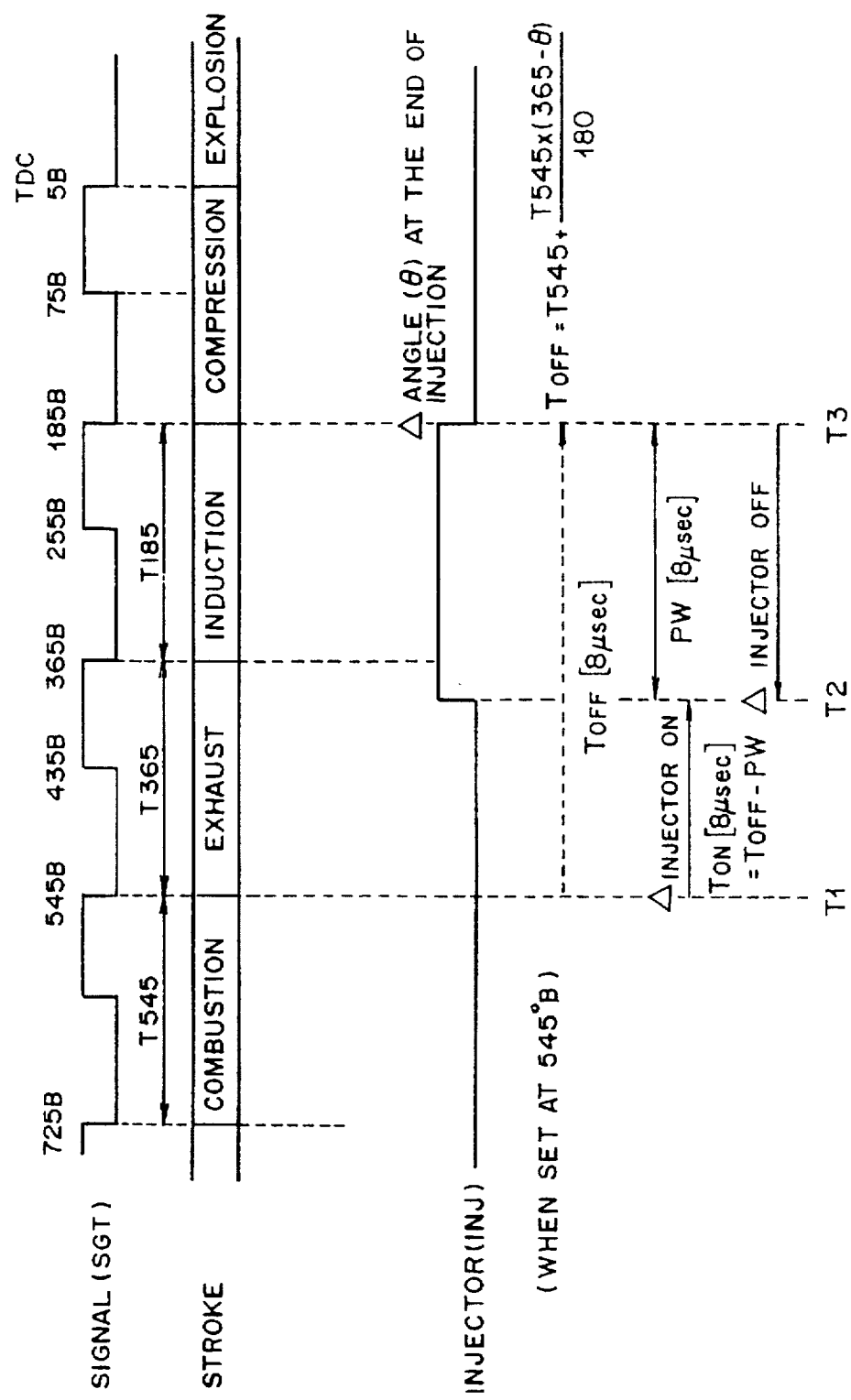
FIG. 7 is a graph for explaining operations of the fuel injection control system according to the first embodiment of this invention for the in-cylinder injection internal combustion engine.

As is shown in the diagram of FIG. 7, at a time T1 where the crank angle is 545° B, computation of an air quantity is conducted and further, computation of an injection ending time is performed in accordance with the following formula:

$$T_{OFF}=T545+[T545\times(365-\theta)/180]$$

This $T_{OFF}$ is a time T3 where injection of fuel is ended. Injection is, therefore ended at the time T3. However, θ in the above formula is a map value determined corresponding to an operation state, and FIG. 7 illustrates an example in which injection is ended in an initial stage of a compression stroke.

It is also constructed that by another system, a fuel injection pulse width Pw as a fuel injection period is calculated corresponding to an operation state of the engine. A time T2 preceding the injection ending time $T_{OFF}$ by the time period of the fuel injection pulse width Pw is set as a fuel injection starting time $T_{ON}$.

$$T_{ON}=T_{OFF}-Pw$$

In the example shown in FIG. 7, this starting time T2 is set in a latter stage of the exhaust stroke. At the time of a start-up at a low temperature, a part of the latter stage of the exhaust stroke and the entire part of the intake stroke are set as a fuel injection period as in the diagram.

Figure 8:
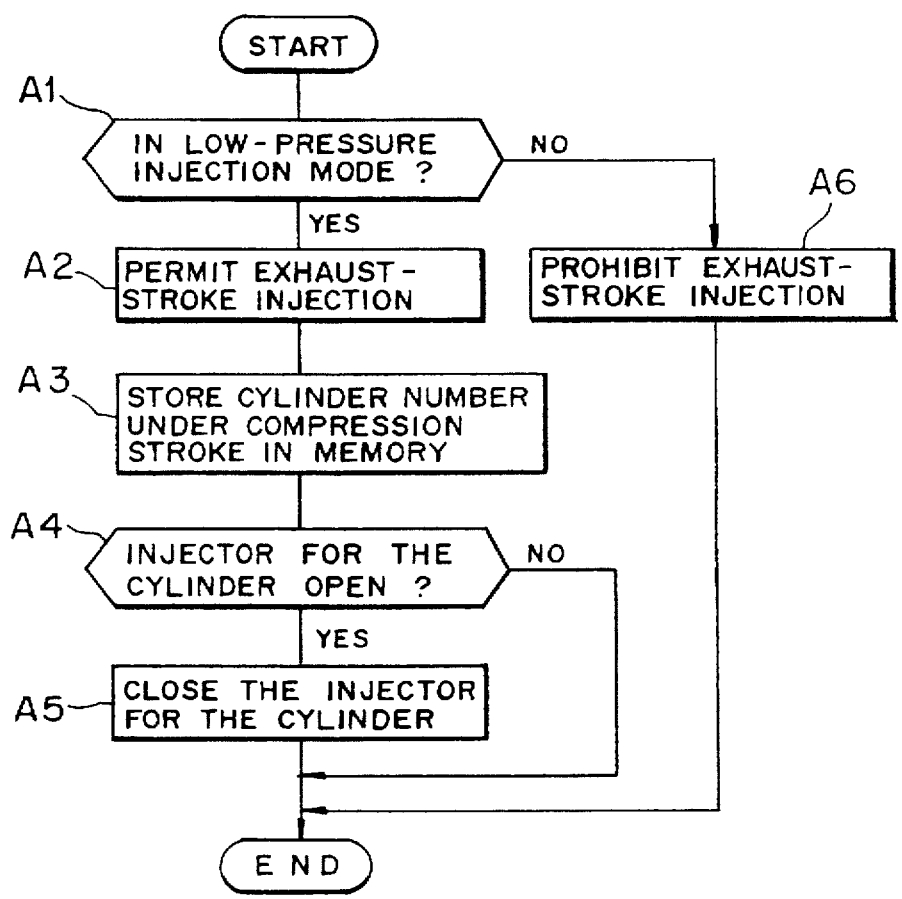
FIG. 8 is a flow chart for explaining operations of the fuel injection control system according to the first embodiment of this invention for the in-cylinder injection internal combustion engine.
Figure 9:
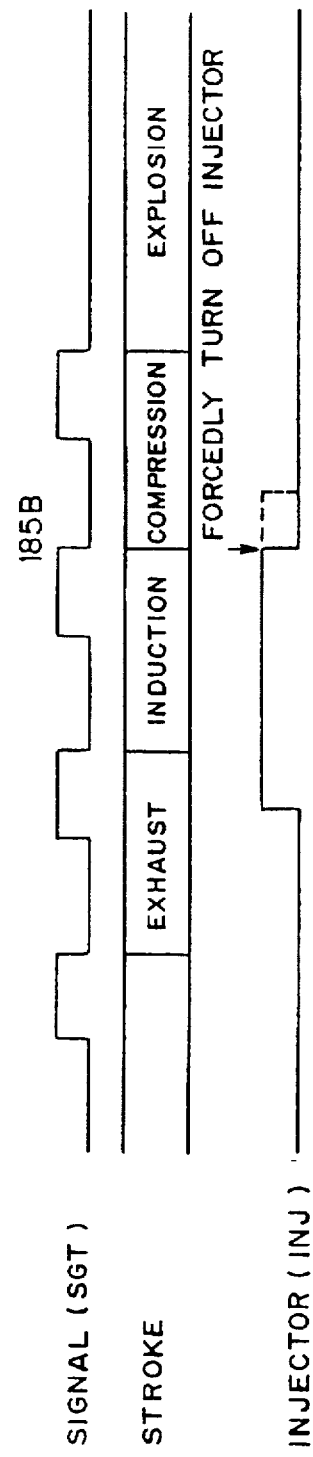
FIG. 9 is a graph for explaining operations of the fuel injection control system according to the first embodiment of this invention for the in-cylinder injection internal combustion engine.

Until the time T3 in the compression stroke after the completion of the intake stroke, an operation for forcedly stopping the injection as shown in FIG. 9 is achieved by operations along the flow chart of FIG. 8.

Also arranged are low-pressure fuel supply means 106 for supplying fuel at a low pressure from the fuel tank 2 to the fuel injection means 101 and high-pressure fuel supply means 107 for supplying fuel at a high pressure from the fuel tank 2 to the fuel injection means 101.

The low-pressure fuel supply means 106 is constructed by a supply system which is composed primarily of the above-mentioned low-pressure fuel pump 4 and the first bypass line 11, whereas the high-pressure fuel supply means 107 is constructed by a supply system which is composed principally of the above-mentioned high-pressure fuel pump 5 and the control valves 9,10.

In addition, operation state detection means 108 for detecting an operation state of the internal combustion engine, and having the function of the start-up detection means 103, is also arranged. In accordance with an output of the temperature detection means 102 and that of the operation state detection means 108, the setting of a fuel injection period by the injection period setting means 104 is performed.

Also arranged are fuel pressure determination means 109 for determining a fuel supply pressure on the basis of an output of the operation state detection means 108 and fuel pressure change-over means 110 for switching the fuel supply pressure to the fuel injection means 101 between a low pressure by the low-pressure fuel supply means 106 and a high pressure by the high-pressure fuel supply means 107 on the basis of an output of the fuel pressure determination means 109.

As is illustrated in FIG. 1, fuel supply pressure setting means 121 is constructed by these low-pressure fuel supply means 106, high-pressure fuel supply means 107, fuel pressure determination means 109 and fuel pressure change-over means 110.

The fuel pressure determination means 109 is arranged in the controller (control means) 30, and the fuel pressure change-over means 110 is composed primarily of the above-mentioned electromagnetic directional control valve 14.

Owing to the construction as described above, a predetermined control signal is outputted from the controller (control means) 30, the fuel pressure to be injected from each fuel injection valve 1 is switched between a low pressure and a high pressure, and injection of fuel is performed at a fuel pressure corresponding to the above-mentioned control of the fuel injection period.

Described specifically, at the time of a start-up at a low temperature, fuel injection at the low temperature is performed in a long period ranging from a part of the exhaust stroke to the entire part of the intake stroke and in an operation state other than the time of a start-up at a low temperature, fuel injection at the high temperature is performed in a short period set in either the intake stroke or the compression stroke.

Owing to the construction as described above, fuel injection control is performed including a start-up at a low temperature. With respect to the low-temperature start-up, in particular, a description will be made in accordance with the flow chart of FIG. 8. In step A1, it is first determined whether the engine is in a low-pressure injection mode. When the engine is in the low-pressure injection mode like the time of a low-temperature start-up, the routine advances through the "YES" route so that step A2 to step A5 are executed.

When the engine is not in the low-pressure injection mode, on the other hand, the routine advances along the "NO" route so that step A6 is executed to prohibit fuel injection in an exhaust stroke.

Namely, when the engine is not in the low-pressure injection mode, fuel injection is performed at a high pressure. High-pressure injection in an exhaust stroke has the potential problem that the fuel may be discharged without combustion. Accordingly, prohibition of such high-pressure injection is effected.

In the low-pressure injection mode, the injection in an exhaust stroke prohibited in step A6 is permitted in step A2.

In the preceding operation, the operation is stopped in an operation state in the high-pressure injection mode. The present operation is, therefore, started in a state where injection in an exhaust stroke is prohibited. However, the permission of injection in an exhaust stroke in step A2 realizes fuel injection in a long period at the time of a low-temperature start-up as set by the fuel injection control.

Upon conducting this control, the above-mentioned calculation of the fuel injection ending time and calculation of the fuel injection starting time are conducted, so that fuel injection ranging from the time T2 in the exhaust stroke to the intake stroke completion time T3 is performed as shown in the diagram of FIG. 7.

Accordingly, by fuel injection at a low pressure, fuel is supplied in a required quantity without insufficiency, so that a smooth low-temperature start-up is performed.

Figure 10:
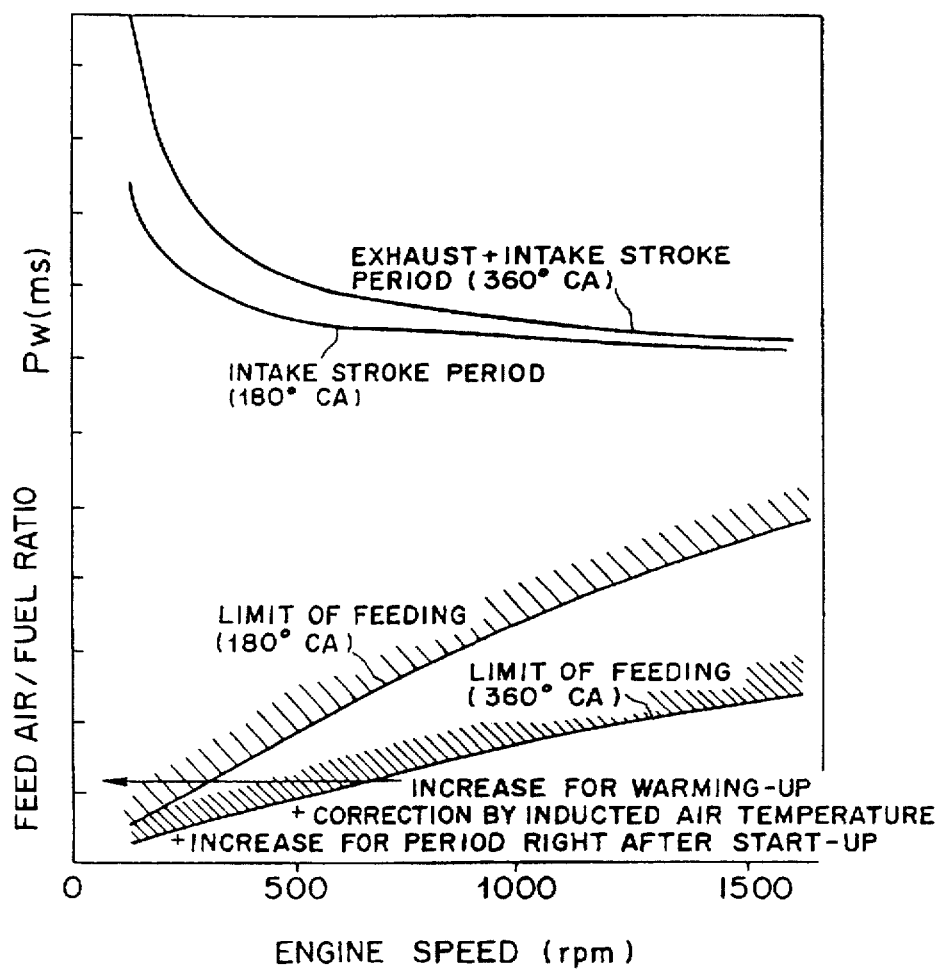
FIG. 10 is a graph showing operation characteristics of the fuel injection control system according to the first embodiment of this invention for the in-cylinder injection internal combustion engine.
Figure 11:
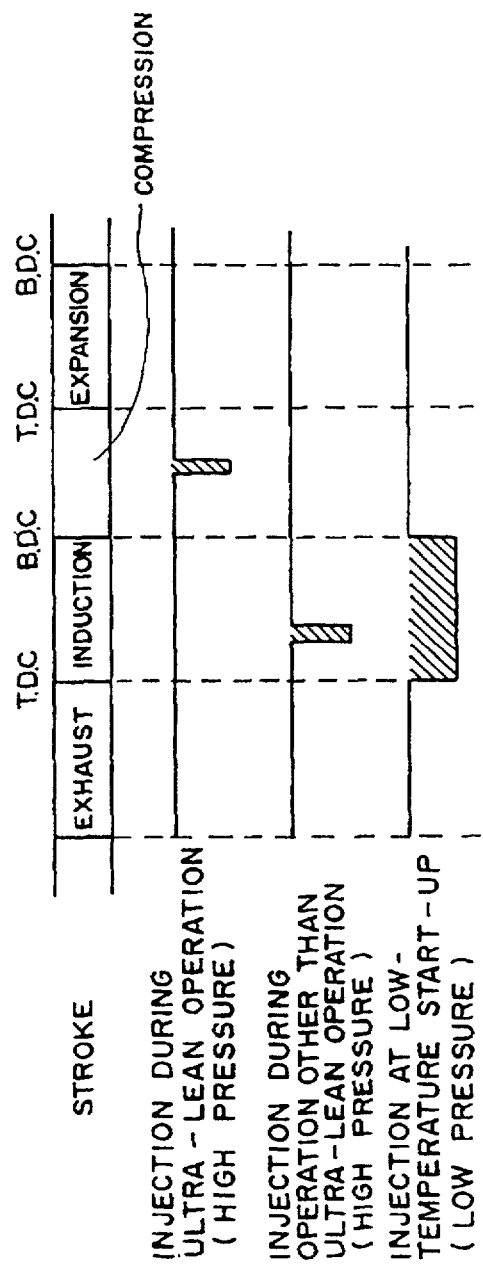
FIG. 11 is a diagram for explaining a fuel injection starting time and an injection period by a conventional fuel injection control system for an in-cylinder injection internal combustion engine.

Namely, by conducting fuel injection from the exhaust stroke as mentioned above, a characteristic with a limit of fuel feeding lowered to a lower position indicated by 360° CA (crank angle) are obtained as shown in the graph of FIG. 10.

It is therefore possible to supply fuel down to 700 rpm or so. From this characteristic, a sufficient fuel supply is also considered to be feasible.

Incidentally, it is performed in step A3 to store in a memory M the number of a cylinder under a compression stroke. In step A4, it is determined whether the injector for the cylinder of that number is open.

If the injector is open, the routine advances along the "YES" route so that step A5 is executed to close the injector for the cylinder.

As is illustrated in FIG. 9, even if the fuel injection pulse width Pw so calculated ranges from an exhaust stroke to a compression stroke, fuel injection in the compression stroke is forced to stop. This makes it possible to prevent cylinder gas from flowing backward to the injector, so that inconvenience such as poor atomization or internal fouling of the injector can be avoided.

Namely, the operations of FIG. 8 have been set in view of the possibility that, as the time of a start-up is a period in which the engine speed increases, an injection period may extends into a compression stroke even if an injection ending time is set in an intake stroke. Adverse effects of such possibility can be avoided by step A5.

When the injector for the cylinder of that number is determined not to be open in step A4, starting of a next operation cycle is awaited without execution of step A5.

In this manner, at the time of a start-up, fuel injection is feasible even in an exhaust stroke. An injection quantity required at the time of a low-temperature start-up can be assured accordingly.

Further, when low-pressure injection is being performed, injection in a compression stroke is prohibited so that cylinder gas is prevented from flowing backward to the injector. This makes it possible to avoid inconvenience, such as poor atomization or internal fouling of the injector, which would otherwise arise by intruded gas.

(b) Description of the Second Embodiment

The first embodiment was described centering around the feature that an injection pulse width at the time of low-pressure injection, which is performed at the time of a start-up, is extended not only over an intake stroke but also to an exhaust stroke to inject fuel at a low pressure into a cylinder. Requirement for injection over such two strokes arises not only in the case that the engine requires fuel in a large quantity like a low-temperature time but also in the case that, because the engine speed has increased to a certain level after completion of a start-up where low-pressure injection has to be chosen due to an insufficient operation of the engine-driven high-pressure fuel pump, a time required for each stroke has become shorter and fuel in a required quantity cannot be injected within the period of a single stroke.

Further, the injection period at the time of low-pressure injection does not always extend over the period of two strokes but, where the quantity of fuel required by the engine is relatively small and the engine speed is rather low, falls within the period of a single stroke.

How properly a fuel injection starting time should be set under each of these situations is extremely important for an in-cylinder injection internal combustion engine in maintaining the engine performance upon high low-pressure injection at the time of a start-up and upon a subsequent change to high-pressure injection.

With the foregoing in view, a description will hereinafter be made about the second embodiment which has been obtained by making the above-described first embodiment more specific and also developing it. In the following second embodiment, the same systems and components as those in the above-described first embodiment will be identified by the same reference numbers and their detailed description is omitted.

First, a drive circuit for the fuel injection valves 1, description of said drive circuit having been omitted in the above-described first embodiment, will be described in relation to this embodiment.

Figure 13:
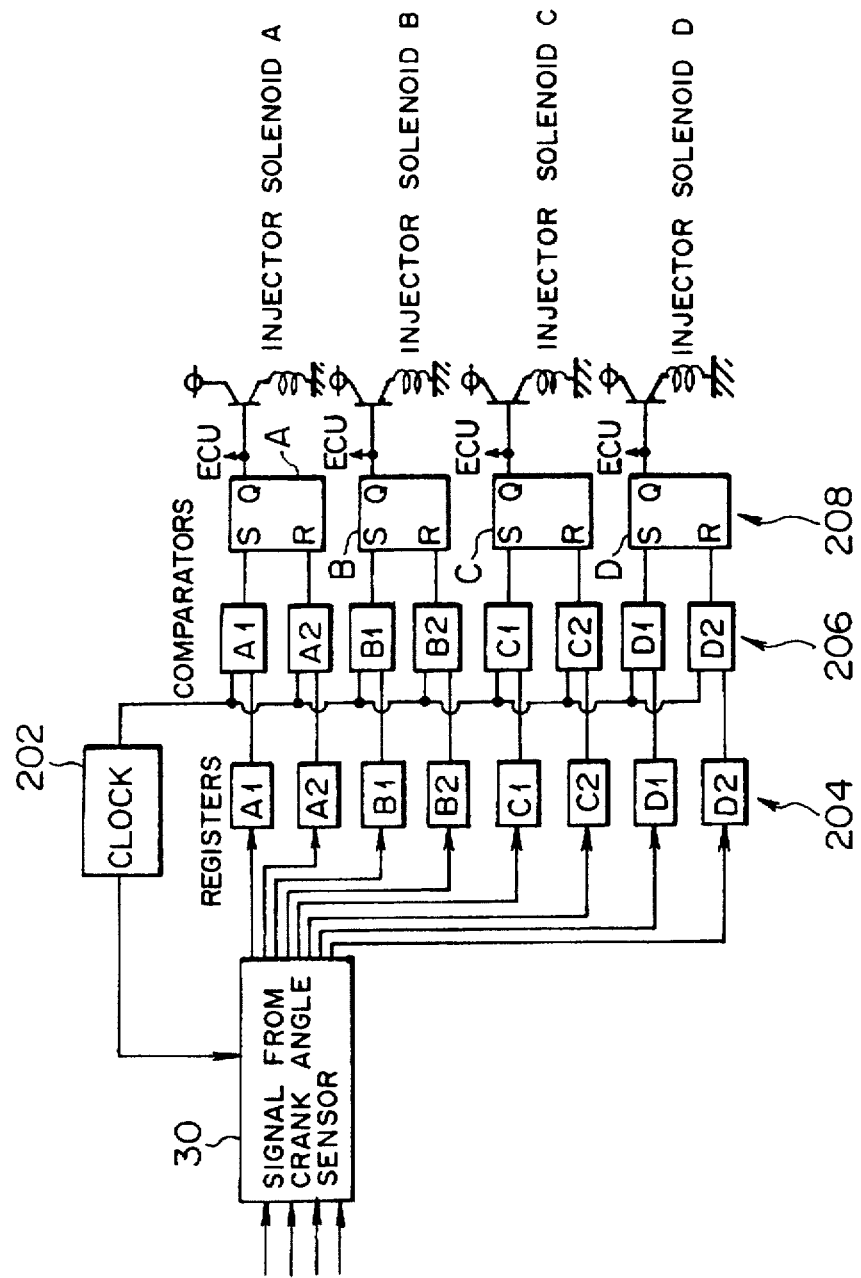
FIG. 13 is a block diagram depicting injector drivers and a controller useful in the fuel injection control system according to the second embodiment of this invention for the in-cylinder injection internal combustion engine and also in a modification thereof.

In FIG. 13, a controller 30 is internally provided with a clock 202. By this clock 202, a current time is inputted. The controller 30 is also provided with valve-opening registers 204 (A1,B1,C1,D1) for storing valve-opening time information and valve-closing registers 204 (A2,B2,C2,D2) for storing valve-closing time information. The pieces of time information of the individual registers 204 (A1,A2,B1,B2, C1, C2,D1,D2) are compared with the current time from the clock 202 at the corresponding comparators 206 (A1,A2, B1,B2,C1, C2,D1,D2). Outputs based on the results of this comparison are inputted to switching flip-flops 208 which serve to turn on or off injector solenoids (A,B,C,D) of the individual fuel injection valves. As a result, when the valve-opening time stored, for example, in the register 204(A1) for the first cylinder equals to the current time from the clock 202, a set signal is outputted from a comparator 206 (A1) to the flip-flop 208(A). The injector solenoid A for the first cylinder is hence brought into an energized state, whereby injection through the fuel injection valve for the first cylinder is started. When the valve-opening time stored in the register 204(A2) for the first cylinder equals to the current time from the clock 202, a reset signal is outputted from the comparator 206(A2) to the flip-flop 208(A) so that the injector solenoid A for the first cylinder is brought into a deenergized state and injection through the fuel injection valve for the first cylinder is ended. Namely, valve-opening time and valve-closing time of each cylinder are determined through the setting of injection starting time data and injection ending time data at the register for the corresponding cylinder by the controller 30.

Further, inputted to the controller 30 which performs functions as the fuel injection control means 120 and the fuel supply pressure setting means 121 are outputs of the individual flip-flops 208, a detection output of the crank angle sensor and a cylinder identification signal (an output of a sensor which generates a signal when a particular cylinder has taken a specific phase) in addition to information on an operation state such as an engine load information, coolant temperature information and starter switch information. An output of each flip-flop 208 represents the state of an operation of its corresponding injector solenoid, that is, its corresponding fuel injection valve. Further, the crank angle sensor detects a signal indicating a crank angle 5° ahead of the top dead center (BTDC5) of each cylinder in a compression stroke and sends it to the controller 30. Accordingly, in the case of a 4-cycle 4-cylinder engine as in this embodiment, a crank signal is inputted per 180° crank angle to the controller 30. Therefore, when a crank signal indicating a phase of BTDC5 with respect to a particular cylinder has been generated, a phase of BTDC185 will be detected with respect to a cylinder which will next undergo an explosion stroke (expansion stroke). As to a cylinder which will then undergo an explosion stroke, a phase of BTDC365 will be detected. Regarding a cylinder which will thereafter undergo an explosion stroke, a phase of BTDC545 will be detected.

Figure 12:
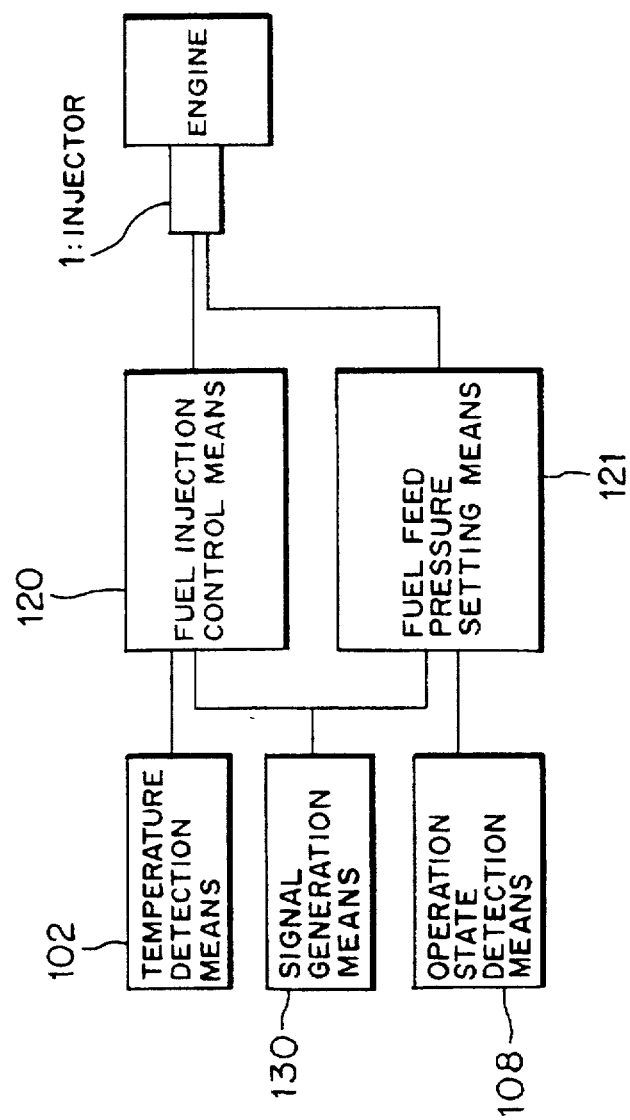
FIG. 12 is a block diagram showing an essential constitution of a fuel injection control system according to a second embodiment of this invention for an in-cylinder injection internal combustion engine.

The controller 30 measures generation intervals of these crank angle signals to calculate engine speed information as operation state information and using these crank angles as trigger signals, performs interrupt processing for driving the injectors and interrupt processing for driving ignition timing drivers. Incidentally, these trigger signals are generated by signal generation means 130 shown in FIG. 12. In the following description, the interrupt processing for driving the injectors will be dealt with and the processing on ignition timing will be omitted. Further, at the controller 30, it is designed to perform a main routine between interrupt processing operations. In this main routine, determination of an operation mode, arithmetic operations on input/output parameters which vary rather slowly, and the like are performed.

A description will next be made about details of processing of the main routine.

Figure 14:
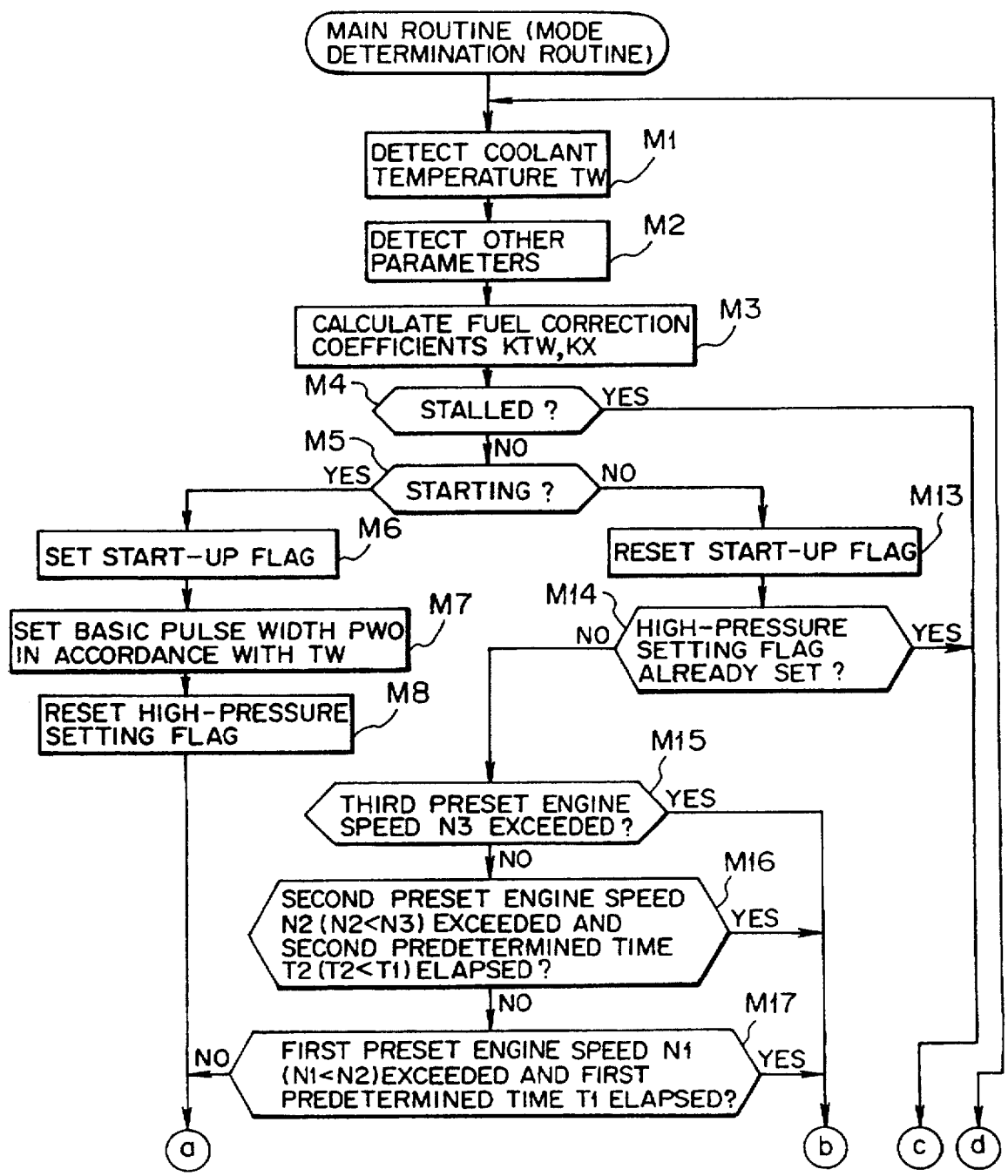
FIG. 14 and FIG. 15 are, in combination, a flow chart illustrating details of processing in a main routine at the controller of the fuel injection control system according to the second embodiment of this invention for the in-cylinder injection internal combustion engine and also in modifications thereof.
Figure 15:
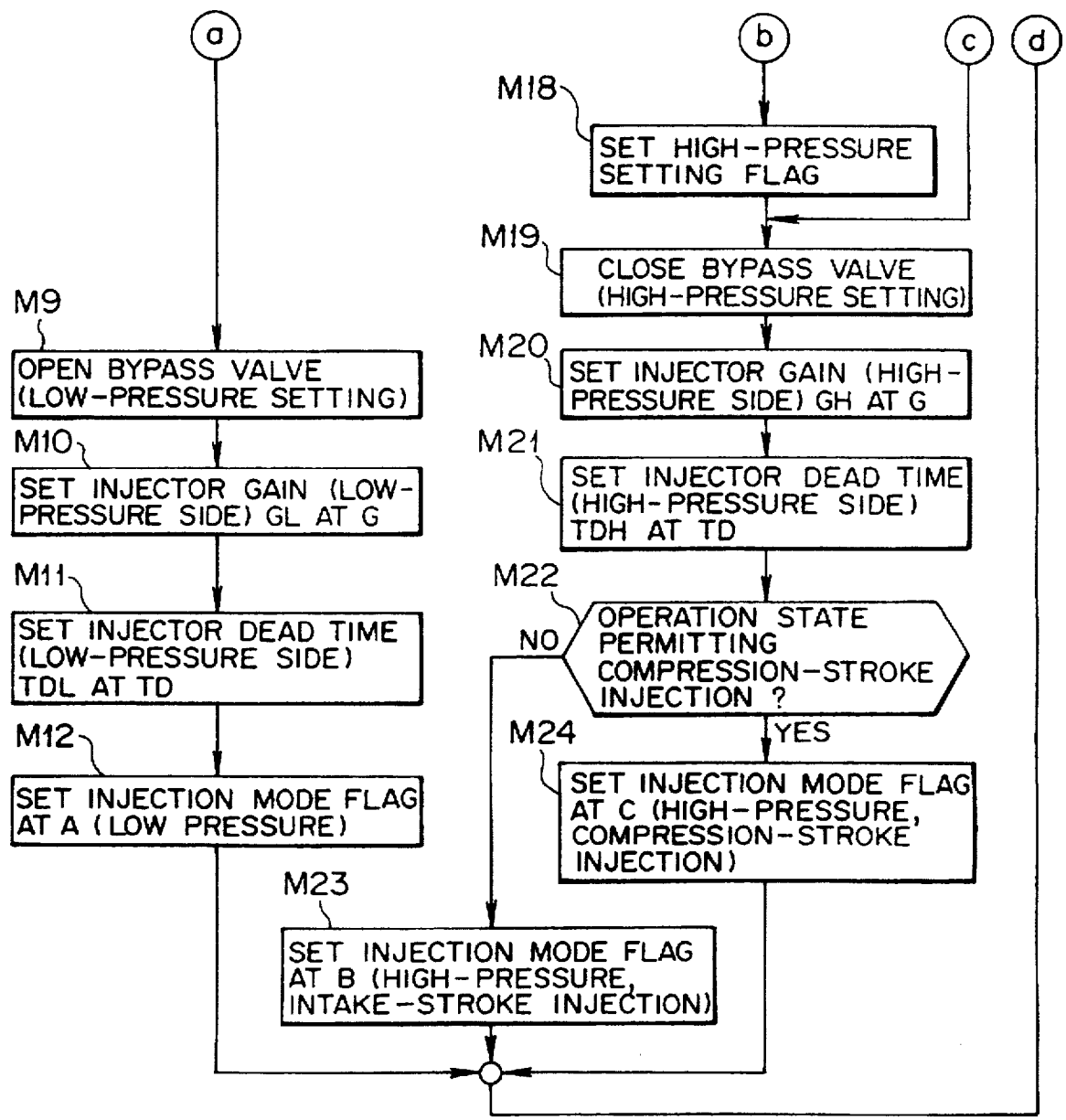

In FIG. 14 and FIG. 15, engine operation state information including a coolant temperature are first detected and calculated (steps M1,M2), followed by the calculation of various fuel correction coefficients led by a fuel correction coefficient (step M3).

Next, whether the engine is in a stalled state is detected by determine whether an engine speed is not higher than a stalling engine speed (for example, 100 rpm) (step M4). When the engine is determined not to be stalled, it is determined whether the engine is under starting (step M5).

When the starter switch is OFF and the engine speed is not higher than a start-up completed engine speed (for example, 500 rpm), the engine is determined to be under starting, a start-up flag is set (step M6), and a basic fuel pulse width corresponding to a coolant temperature is read from a map of a storage ROM and is set (step M7). Incidentally, this starting basic pulse width is set under the premise that the fuel injection valves perform low-pressure injection.

After a high-pressure setting flag which is to be described subsequently herein is reset (step M8), the electromagnetic directional control valve 14 is opened as in the first embodiment (step M9), an injector gain for a low-pressure mode is set (step M10), an injector dead time for the low-pressure mode is selected (step M11), and further, a low-pressure injection mode flag is set as an injection-mode flag (step M12).

On the other hand, when the engine is determined to have completed a start-up in step M5, a start-up flag is reset (step M13), and it is determined whether a high-pressure setting flag has already been set (step M14). If even one of the conditions is found to be met in any of steps M15 to M17, the operation of the high-pressure fuel pump 5 is determined to have been brought into a normal state, the above flag is set in step M18. The setting of this flag means that high-pressure injection can be performed.

Conditions which indicate the possibility of performance of high-pressure injection include first "that the engine speed after a start-up has reached even only once a third preset engine speed N3 set, for example, at 1,000 rpm or higher" (step M15), next "that the engine speed after a start-up is higher than an idling speed in a warm state and after a second preset engine speed N2 set at a value lower than the third preset engine speed N3 was reached, a second predetermined time T2 has elapsed" (step M16), and further that the engine speed after a start-up is of a value similar to a start-up determining engine speed Nst or is higher than the start-up determining engine speed Nst and after a first preset engine speed Ni set lower than the idling speed in the warm state was reached, a first predetermined time T1 longer than the second predetermined time T2 has elapsed (step M17).

When none of these conditions are met, the operation of the high-pressure fuel pump 5 is determined not to have been brought into a normal state and setting of a low-pressure fuel injection mode is performed in step M9 onwards.

On the other hand, when any one of the determinations in step M15 to M17 is determined to be YES, a high-pressure setting flag is set (step M18) and setting of a high-pressure fuel injection mode is performed in step M19 onwards. After the high-pressure setting flag has been set, the high-pressure fuel injection mode is basically maintained based on the determination of YES in step M14 until the ignition key is turned off (unless any specific failure state arises).

In the high-pressure fuel injection mode so set, as in the first embodiment, the electromagnetic directional control valve 14 is closed (step M19), selection of a high-pressure mode injector gain is conducted (step M20), selection of an injector dead time for the high-pressure mode is performed (step M21), and in step M22, it is determined whether the engine is in an operation state where compression-stroke injection is permitted. This operation state where compression-stroke injection is permitted corresponds to a low-load operation range after completion of warming-up. In this operation state, combustion is performed in an extremely lean state such that the air/fuel ratio ranges from 30 to 40. When the engine is determined to be in an operation state where compression-stroke injection is permitted, a high-pressure compression-stroke injection mode flag is set as the injection mode flag (step M24). Otherwise, a high-pressure intake-stroke injection mode flag is set as the injection mode flag (step M23). Incidentally, in step M22, the intake-stroke injection mode is preferentially selected for a certain period immediately after the high-pressure setting has been set (i.e., immediately after a change-over from the low-pressure injection mode).

A description will next be made about the injector-driving interrupt processing.

Figure 16:
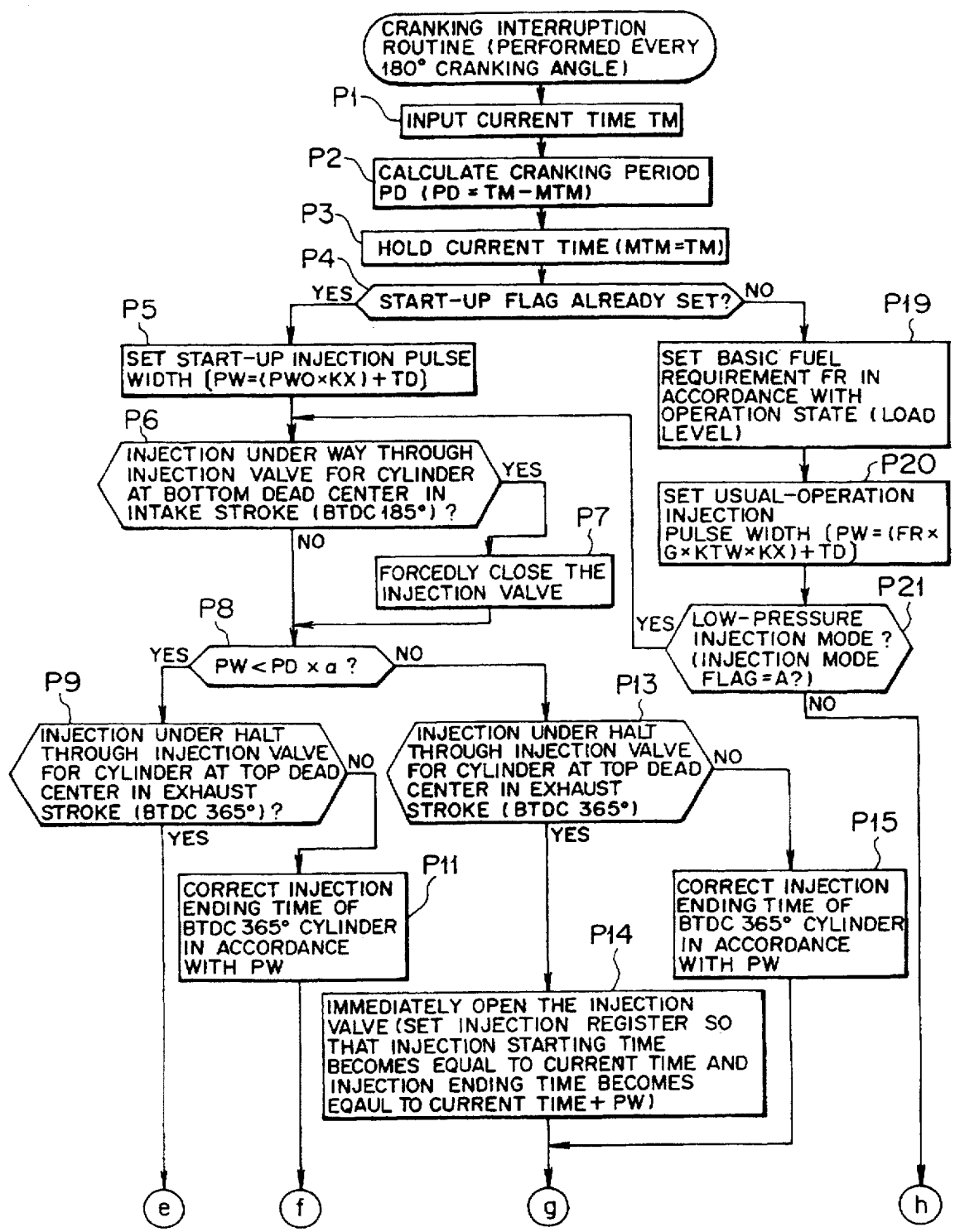
FIG. 16 and FIG. 17 are, in combination, a flow chart illustrating details of processing in a cranking interruption routine at the controller of the fuel injection control system according to the second embodiment of this invention for the in-cylinder injection internal combustion engine.
Figure 17:
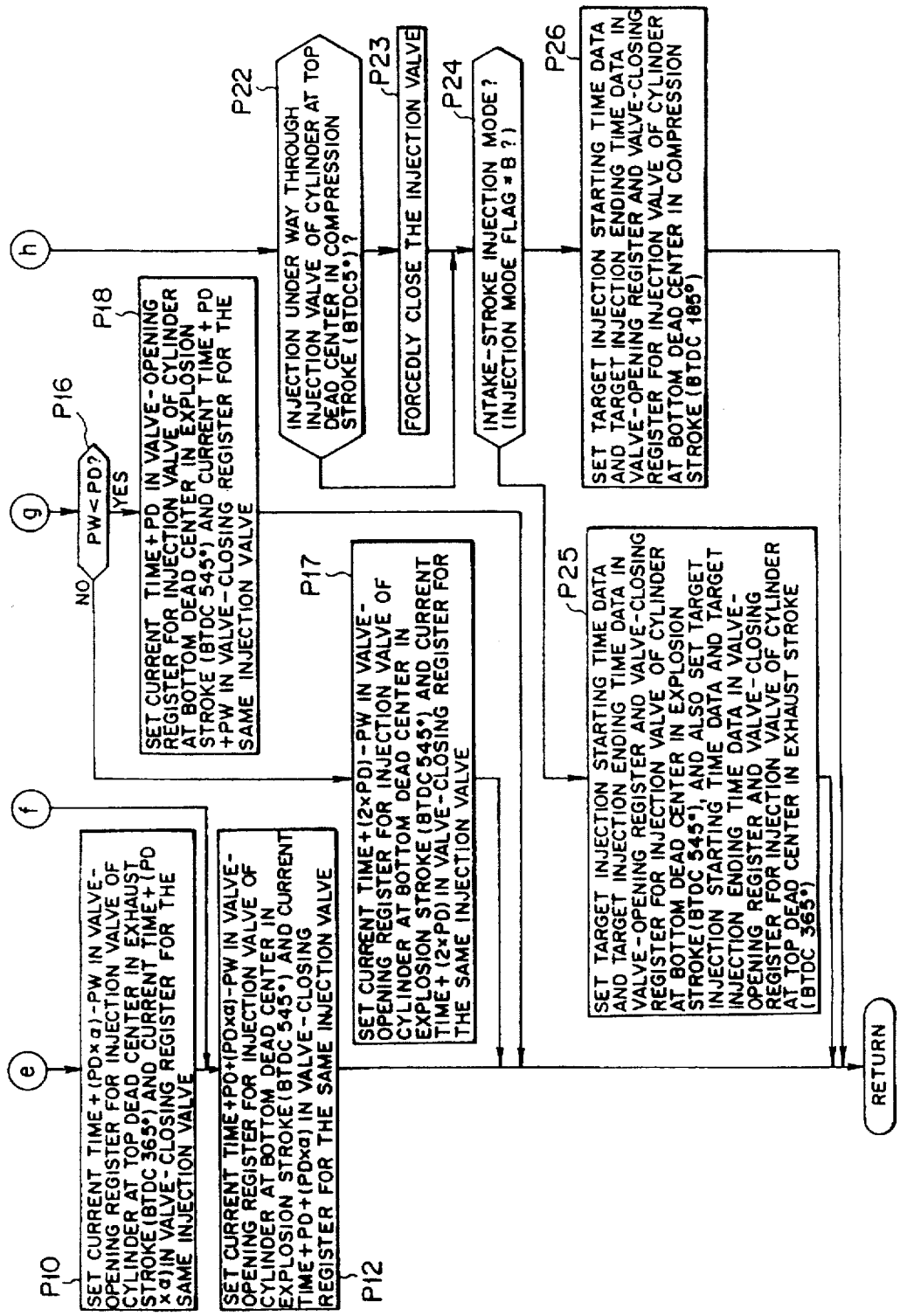

In FIG. 16 and FIG. 17, upon generation of a crank angle signal at BTDC5 of a particular cylinder I, a current time is first read from the clock 202 (step P1), and an interval between the current time and a preceding time data read at the time of the preceding cranking interrupt processing is calculated to determine a cranking period PD (a time required for the crankshaft to rotate over 180°) (step P2), and the current time is stored at a predetermined address in preparation for measurement of a cranking period at the time of next cranking interrupt processing (step P3). Incidentally, information on an engine speed is calculated based on this cranking period PD.

It is next determined whether the start-up flag controlled in the main routine has been set (step P4). If it has already been set (in other words, the engine is under starting), setting of a starting fuel injection pulse width PW is performed (step P5). Upon this setting, the starting basic pulse width data PWO obtained in the main routine is multiplied by a fuel correction coefficient KX, to which the dead time data TD for which the value for low-pressure injection has been selected in the main routine is added.

On the other hand, if the start-up flag has been reset, setting of a basic fuel quantity requirement FR is performed in accordance with an operation state, especially the state of a load (step P19) and then, setting of a fuel injection pulse width PW for the time of an ordinary operation is performed (step P20). For this setting, the basic fuel quantity requirement FR, the injector gain G and injector dead time TD selected in the main routine, and the correction coefficients KTW,KX set in the main routine are used. Incidentally, in a fuel cut mode such as at the time that stalling has been determined or at the time of a deceleration, the fuel injection pulse width PW is set at 0. It is next determined whether the engine is in the low-pressure injection mode at the current time (step P21).

When a start-up mode has been determined and the setting of the starting injection pulse width has been performed or when the low-pressure injection mode has been determined in step P21, it is determined whether the fuel injection valve 1 for a cylinder J (the cylinder at BTDC185), which will undergo a combustion stroke next to the particular cylinder I, is performing injection (step P6). If injection is under way, the injection valve 1 is forcedly closed (step P7). This is to close the injection valve 1 before the cylinder J reaches a compression stroke and its internal pressure increases. This closing operation is performed by storing a time data immediately after the current time in the valve-closing register 204 for the cylinder J.

It is next determined whether the fuel injection pulse width PW is not longer than 100 ×α% of the cranking period PD. This is to determine whether injection is feasible at a predetermined phase (for example, BTDC300) in injection where the fuel injection pulse width PW falls in only an intake stroke. In other words, if the fuel injection pulse width PW is short beyond a certain level compared with the cranking period PD, it is possible to complete injection at the above-described prescribed phase by starting injection at or after the beginning of an intake stroke (in practice, BTDC365). To conduct injection in an intake stroke, it is necessary for good combustion to disperse fuel mist to a certain degree (within a certain range) inside the combustion chamber. It is therefore most preferred to end injection at a predetermined phase in a former half of the intake stroke (for example, around BTDC300). Accordingly, in the high-pressure intake-stroke injection which basically permits injection of fuel in its entirety in only a former half of an intake stroke, an injection ending time is set at a time around the predetermined phase.

In low-pressure injection, it is also preferred in view of a subsequent change to high-pressure injection to set an injection ending time as close as possible to that for a period after a change-over to high-pressure injection to avoid a change in output or the like due to a change in the state of atomization between before and after the change to the high-pressure injection. When the fuel injection pulse width PW becomes equal to or smaller than a predetermined rate relative to the cranking period PD, injection starts at or after the beginning of an intake stroke (actually, BTDC365) and the injection can be ended at a time around the predetermined phase, the injection ending time is therefore set preferentially at the predetermined phase. Thus, to determine whether the fuel injection pulse width is one permitting the setting of the end of injection at the predetermined phase, the determination of step P8 is performed. Incidentally, when the predetermined phase for ending the injection is selected at BTDC300, α is set around 0.36 (≈65/180).

When the answer in step P8 is YES, that is, when the setting of the end of injection at the predetermined phase is determined to be feasible, it is determined whether injection through the fuel injection valve 1 for a cylinder K (the cylinder at BTDC365), which undergoes a combustion stroke next to the cylinder J (the cylinder at BTDC185), is under halt (step P9). When injection is under halt, data of TS1 |the current time+(PD×α)−PW| is inputted to the valve-opening register for the cylinder K while data of TE1 |the current time+(PD×α)| is inputted to the valve-closing resister for the same cylinder K.

As a consequence, the fuel injection valve for the cylinder K opens upon an elapsed time of |(PD×α) −PW| from the current type and closes upon an elapsed time of (PD×α) from the current time. Accordingly, the injection period of the fuel injection valve for the cylinder K is set at PW and the injection ending time is set at a time around the predetermined phase (for example, BTDC300) of the cylinder K. Because the injection starting time data and injection ending time data have already been stored at the valve-opening register and valve-closing register of the cylinder K in step P12 (or P17,P18) of the preceding cranking interruption routine, these previously-inputted data are updated in step P10 by their corresponding date obtained from information on a latest operation state.

When the injection pulse width is relatively short as described above, the setting of a basic injection starting time as a delay time from a basic crank pulse signal makes it possible to inject a required quantity of fuel in its entirety within an intake stroke even when the engine speed suddenly increases reflecting the completion of a start-up of the engine or the like.

On the other hand, when the injection valve for the cylinder K is determined to be in operation in step P9, the data of the valve-closing register for the cylinder K is solely updated to change only the injection quantity to a value corresponding to information of a latest operation state without resetting the injection starting time of the injection from the viewpoint of giving the priority to the proper setting of an injection quantity required by the engine (when resetting, the injection valve is once closed and injection is then performed again, so that the injection quantity may deviate from an adequate value or the injection starting time itself may deviate from an optimal value due to a time lag associated with the opening and closure of the valve).

This updating is performed by adding fuel injection pulse width data PW, which has been obtained this time, to the valve opening time data stored in the valve-opening register for the cylinder K and calculating updated data for setting a valve closing time or by correcting the valve closing time data RTE1, which is stored in the valve-closing register, with a difference ΔPW between the fuel injection pulse width data RPW obtained in the preceding cranking interruption routine and the current pulse width data PW. Incidentally, where the corrected valve closing time data TE1 is before the current time, time data immediately after the current time is inputted to the valve-opening register to instantaneously close the injection valve.

After processing is completed in steps P9,P10,P11 with respect to the cylinder K which is near the exhaust top dead center, data of |the current time+PD+(PD×α)−PW| is inputted to the valve-opening register of the fuel injection valve for a cylinder K at BTDC545 near the explosion bottom dead center (i.e., a cylinder which will undergo a combustion stroke next to the cylinder K) and data of |the current time+PD+(PD×α)| is inputted to the valve-closing register for the cylinder M (step P12), whereby the current cranking interruption routine is completed.

As a result, the opening and closing timing of the fuel injection valve for the cylinder M is provisionally set in such a way that the fuel injection valve opens upon an elapsed time of |PD+(PD×α)−PW| from the current time (in the intake stroke) and closes upon an elapsed time of |PD+(PD× α)| from the current time. Accordingly, the injection period of the fuel injection valve for the cylinder M is provisionally set at PW while the injection ending time is provisionally set at a time around a predetermined phase (for example BTDC300) in an intake stroke of the cylinder M. The valve-opening register and valve-closing register for the cylinder M are updated in step P10 (or P14,P11,P15) of the next cranking interruption routine. However, if the injection starting time provisionally set in the valve-closing register is reached before the next execution of the cranking interruption routine, injection into the cylinder M is started based on the provisionally-set data.

On the other hand, when the determination in step P8 is NO, that is, when it is determined that the fuel injection pulse width PW is greater than the predetermined rate relative to the cranking period PD and injection in the period of an intake stroke alone is determined to be impossible to set the end of injection at a predetermined phase (for example, BTDC300), it is determined whether injection through the fuel injection valve 1 for the cylinder K (the cylinder at BTDC365) is under halt (step P13). If injection is under halt, data corresponding to a time immediately after the current time is inputted to instantaneously start injection and data of (the data corresponding to the time immediately after the current time+PW) is inputted to the valve-closing register for the same cylinder K.

As a consequence, the fuel injection valve for the cylinder K instantaneously opens and upon an elapsed time of (PW) from the current time, closes. Accordingly, the injection period of the fuel injection valve for the cylinder K is set at PW while the injection ending time is set at a phase retarded than the predetermined phase (for example, BTDC300) of the cylinder K. Incidentally, the injection starting time data and injection ending time data have already been stored in the valve-opening register and valve-closing register for the cylinder K in step P12 (or P17,P18) of the preceding cranking interruption routine. These data are therefore updated in step P14.

Even when the engine speed suddenly increases after starting fuel injection and the time interval of the period of a single stroke becomes shorter, a fuel injection pulse width longer than a certain level and starting of injection in unison with a reference signal of BTDC365 make it possible to assure an injection quantity in a period equivalent to the period of the single stroke. It is therefore possible to inject fuel in a quantity close to a required quantity of fuel even if forced valve closure is performed at BTDC185 in step P7.

On the other hand, when the injection valve for the cylinder K is determined to be in operation in step P13, only the data of the valve-closing register for the cylinder K is updated as in step P11 to change only the injection quantity to a value corresponding to information on a latest operation state (step P15).

The data stored in the registers are then reset in step P14 and step P15. After the completion of the processing with respect to the cylinder K which is near the exhaust top dead center, it is determined whether the fuel injection pulse width PW is shorter than the cranking period PD (namely, a time required for a single stroke) (step P16). Based on their difference, setting of the injection starting time for the cylinder M which is near the bottom dead center is performed.

Namely, the determination of YES in step P16 means that injection can be completed in its entirety in only a single stroke. In this case, the injection starting time is set so that the whole quantity is injected in the intake stroke and the injection ending time is as apart as possible from the compression bottom dead center stroke.

Injection in only an intake stroke without using an exhaust stroke is meritorious for preventing through-blow of fuel to an exhaust system. Moreover, when injection is performed in an intake stroke, setting of an injection starting time as advanced as possible makes it possible to gain time until ignition takes place and is hence advantageous in dispersing, atomizing and uniformly mixing the fuel.

Described specifically, when (PD×α)≦PW<PD, time data of (the current time+PD) is set at the valveopening register for the injection valve of the cylinder M and time data of (the current time+PD+PW) is set at its valve-closing register, so that the injection starting time of the cylinder M is set at a time around the exhaust top dead center (for example, BTDC365) (step P18).

On the other hand, determination of NO in step S16 means that injection cannot be performed in its entirety in only a single stroke. In this case, an injection period is set using the entire period of the intake stroke and a part of the exhaust stroke, because use of a compression stroke as an injection period results in occurrence of a backward flow of cylinder gas to the injection valve due to an increase in the internal cylinder pressure in the case of low-pressure injection and is not preferred and with respect to an injection period not coverable even if the entire period of an intake stroke is used, it is preferred to extend the injection period to the side of an exhaust stroke.

Described specifically, when PD≦PW, time data of [the current time+(2×PD)] is set at the valve-closing register for the injection valve of the cylinder M and time data of [the current time+(2×PD)–PW] is set at the valve-opening register, so that the injection ending time of the cylinder M is set in the proximity of the intake bottom dead center (for example, BTDC185) (step P17). As the valve-opening time data set in step P17 is a value which precedes the next execution of the cranking interruption routine, the determination of step P13 of the cranking interruption routine is always NO when PD≦PW unless the angular speed of the crankshaft increases substantially. Therefore the injection starting time is not reset (in other words, step P14 is not executed).

Figure 18:
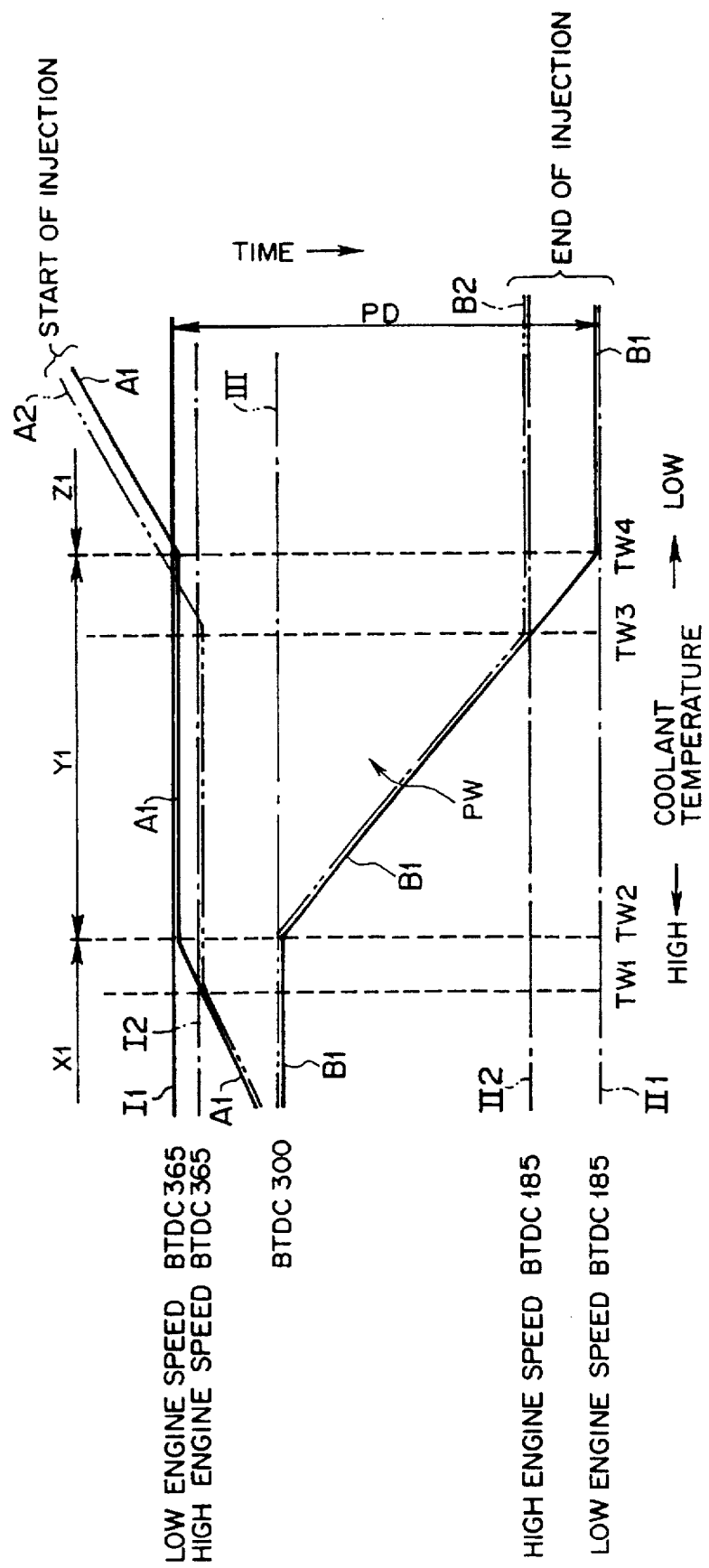
FIG. 18 is a diagram showing inventor-valve-opening control characteristics of the fuel injection control system according to the second embodiment of this invention for the in-cylinder injection internal combustion engine.

Here, the injection starting time at the time of the low-pressure injection mode can be diagrammatically illustrated as shown in FIG. 18. In FIG. 18, coolant temperatures are plotted along the abscissa (in the diagram, the coolant temperature becomes lower in a rightward direction) and elapsed time are plotted along the ordinate. Injection starting time and Injection ending time at a first specific engine speed (low speed) are indicated by solid lines A1 and B1, respectively. Therefore, the distance between these solid lines at each coolant temperature is equivalent to a fuel injection pulse width PW for the coolant temperature. Namely, the fuel injection pulse width becomes longer as the coolant temperature drops.

Further, an alternate long and short dash line III which extends along the abscissa represents a predetermined phase (BTDC300) as a reference time in an intake stroke, an alternate long and short dash line I1 shows the time of the exhaust top dead center at the above-described first specific engine speed, and an alternate long and short dash line II1 designates the time of the intake bottom dead center at the above-described first specific engine speed. Therefore, the distance between the alternate long and short dash lines I1 and II2 corresponds to a cranking period PD at the above-described first specific engine speed. As is appreciated from this diagram, at the first specific engine speed and in a coolant temperature range of TW2 and higher (namely, range X1), the fuel injection pulse width PW falls between the exhaust top dead center and the predetermined phase of the intake stroke [namely, PW<(PD×α)]. In this temperature range, the injection ending time indicated by B1 is, therefore, set preferentially at the predetermined phase BTDC300, and the injection starting time A1 is set closer to the exhaust top dead center BTDC365 as the injection pulse width PW becomes longer.

On the other hand, when the coolant temperature is lower than TW2 but higher than TW4 (range $Y_1$), the fuel injection pulse PW falls within a single stroke [namely, (PD×α)≦PW<PD]. In this temperature range, the injection starting time indicated by A1 is set preferentially at BTDC365 at a time around the exhaust top dead center, and the injection ending time B1 is set closer to the intake bottom dead center BTDC185 as the injection pulse width PW becomes longer. Further, in a range that the coolant temperature is lower than TW4 (range Z1), the fuel injection pulse width PW does not fall in a single stroke (namely, PD≦PW). Accordingly, the injection ending time B1 is set preferentially at the intake bottom dead center BTDC185, and the injection starting time A1 is set to extend longer in the exhaust stroke as the injection pulse width PW is becomes longer.

When the engine speed is at a second engine speed (higher than the first engine speed), the exhaust top dead center BTDC365 is indicated by an alternate long and short dash line I2 and the intake top dead center BTDC185 is designated by an alternate long and short dash line II2, when a predetermined phase BTDC300 in an intake stroke is used as a reference. Accordingly, the temperature range in which the injection ending time is set preferentially at the predetermined phase BTDC300 changes to TW1 (>TW2) and higher, the temperature range in which the injection starting time is set preferentially at the exhaust top dead center BTDC365 changes to a range between TW1 and TW3 (>TW4), and the temperature range in which the injection ending time is set preferentially at intake bottom dead center BTDC185 changes to a range lower than TW3. Namely, it can be understood that in this embodiment, the injection starting time at the time of low-pressure injection is controlled in accordance with the state of an engine operation led by an engine speed and a coolant temperature.

Now, returning to FIG. 16 and FIG. 17, a brief description will be made about a case where highpressure injection is performed. When the engine determined not to be in the low-pressure injection mode in step P21, it is determined in step P22 whether a cylinder at the compression top dead center, that is, the particular cylinder I is under injection, and if the cylinder is under injection, the injection is forcedly stopped (step P23). It is then determined whether the injection mode is an intake-stroke injection mode or a compression-stroke injection mode (step P24).

If the injection mode is determined to be the intake-stroke injection mode, injection time information (for example, injection ending time information) corresponding to a current operation state is read from an injection time map for high-pressure intake-stroke injection. Corresponding to engine speeds and engine loads, the map has been stored in advance in a storage device. Using the cranking period PD, the information is converted to information on time lags from the current time in the cylinders K,M. From this time lag information and the injection pulse width PW, injection starting time data for the respective cylinders are obtained as information on time lags from the current time and are inputted in the valve-closing resisters and valve-opening registers for the individual cylinders K,M (step P25). As a result, in the cylinder K, fuel injection is performed at a time designated by the injection time map before a next cranking interruption pulse occurs. Incidentally, the injection ending time at a low engine speed in this high-pressure intake-stroke injection is set at a time around the above-described predetermined phase (namely, the predetermined phase set in a former half of an intake stroke, for example, BTDC300), especially placing a focus at the time of a low to medium load so that a change in output is small between before and after a change-over from low-pressure injection (as the time interval from the exhaust top dead center to the above predetermined phase becomes equal to or greater than a certain level from at a low engine speed, a pulse width which allows injection to be completed within only an intake stroke becomes substantially large even if the time around the predetermined phase is set as an injection ending time).

When the injection mode is determined to be a compression-stroke injection mode in step P24, information on an injection time (for example, information on an injection ending time) corresponding to a current operation state is read from an injection time map for high-pressure compression-stroke injection. Corresponding to engine speeds and engine loads, this map has been stored in advance in a storage device. Using the cranking period PD, the information is converted to information on a time lag from the current time in the cylinder J. From this time lag information and the injection pulse width PW, injection starting time data for the cylinder J is obtained as information on a time lag from the current time and is inputted in the valveclosing resister and valve-opening register for the cylinder J (step P26). As a result, in the cylinder J, fuel injection is performed at the time designated by the injection time map.

Figure 19:
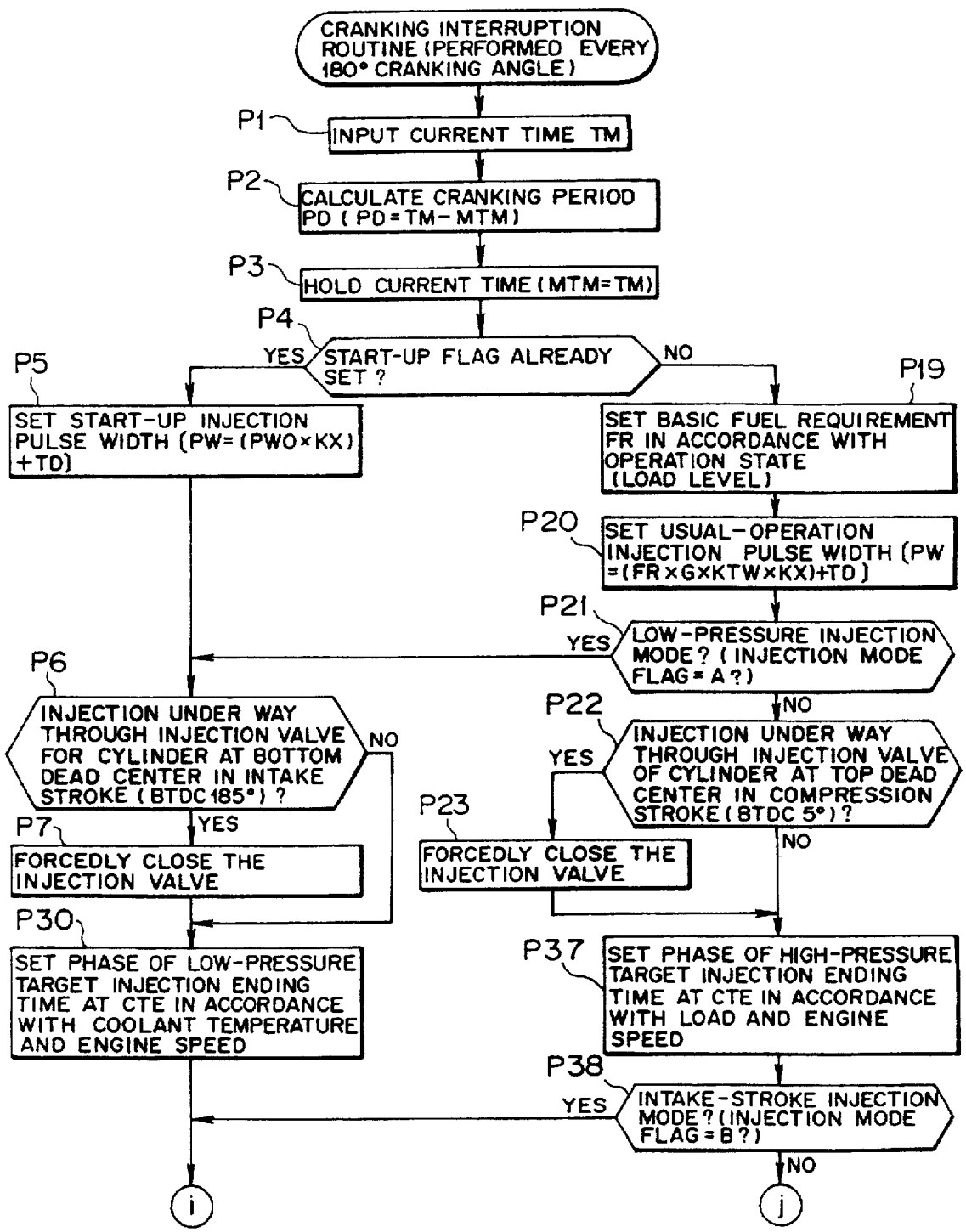
FIG. 19 and FIG. 20 are, in combination, a flow chart illustrating details of processing in a cranking interruption routine at the controller of the fuel injection control system according to the modification of the second embodiment of this invention for the in-cylinder injection internal combustion engine.
Figure 20:
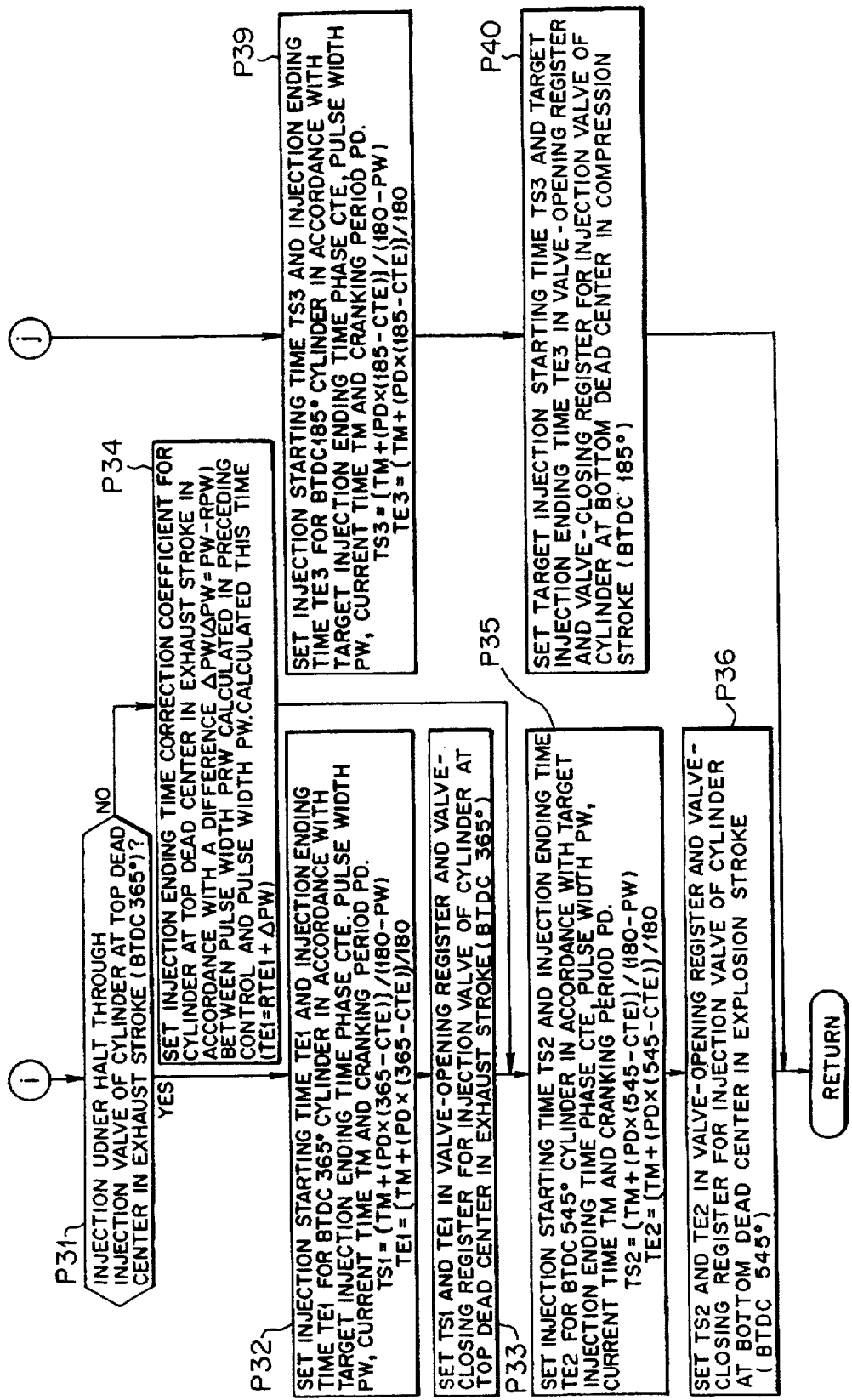

A modification of the second embodiment which has been described primarily with reference to FIG. 16 and FIG. 17 will next be described with reference to FIG. 19 and FIG. 20. In the second embodiment, the injection time at the time of low-pressure injection was set depending on the rate of the fuel injection pulse width PW relative to the cranking period data PD. Namely, the injection ending time was set preferentially at the prescribed phase in the former half of the intake stroke when the rate was small, the injection starting time was set preferentially at the time around the exhaust top dead center when the rate was medium, and the injection ending time was set preferentially at the time around the intake bottom dead center when the rate is large. This setting, in other words, as has been described with reference to FIG. 18, the injection time has characteristics which vary depending on a coolant temperature and an engine speed. Therefore, as a substitute for the second embodiment, it can be contemplated to store beforehand the injection time at the time of low-pressure injection mode in the form of a data map, which contains as input parameters engine temperatures typified by coolant temperatures and engine speeds, in the memory device of the controller, to read one of the stored values based on the results of detection of an actual engine speed and engine coolant temperature and then to set an injection time (for example, an injection ending time). The modification shown in FIG. 19 and FIG. 20 sets an injection time at the time of the low-pressure injection mode on the basis of injection ending time data prepared into the form of a data map of engine speeds and engine coolant temperatures. Further, in the modification of FIG. 19 and FIG. 20, injection time at the time of the high-pressure injection mode is set, as in the second embodiment of FIG. 16 and FIG. 17, based on injection ending time information in the form of a data map of engine speeds and engine loads. In this modification, at the time of the low-pressure injection mode, an injection time is set based on at least an engine speed and an engine coolant temperature. At the time of the high-pressure injection mode, an injection time is set based on at least an engine speed and an engine load. Needless to say, the injection time information stored in the controller 30 can be injection starting time information rather than the injection ending time information. In the modification of FIG. 19 and FIG. 20, steps which perform the same functions as the embodiment of FIG. 16 and FIG. 17 are identified by like reference symbols and their detailed description is omitted herein.

In FIG. 19 and FIG. 20, when low-pressure injection is instructed through step P5 or step P21, information on target injection ending time phases for low-pressure injection stored in the storage device (ROM) of the controller 30 is read in accordance with an actual engine coolant temperature and engine speed in step P30 and is set as CTR. In step P31, it is determined whether injection through the injection valve for the exhaust top dead center cylinder K is under halt. If the injector is in operation, like step P11 in FIG. 16 and FIG. 17, a correction is made to the injection ending time (step P34). When the injector for the cylinder K is out of operation, injection starting time data TS1 and injection ending time data TE1— which are to be inputted to the valve-opening register and the valve-closing register for the cylinder K, respectively—are calculated in accordance with the following arithmetic formulas on the basis of the target injection ending time phase CTE, an injection pulse width PW, a current time TM and a cranking period PD (step P32).

$$TS1=TM+[PD\times(365-CTE)/180]-PW$$

$$TE1=TM+[PD\times(365-CTE)/180]$$

After the calculation results are set in the corresponding registers for the injection valve of the cylinder K (step P33), injection starting time data TS2 and injection ending time data TE2 for the cylinder M at a time around the explosion bottom dead center are also calculated in accordance with the below-described arithmetic formulas (step P35). The calculation results are then set in the corresponding registers for the cylinder M (step P36).

$$TS2=TM+[PD\times(545-CTE)/180]-PW$$

$$TS2=TM+[PD\times(545-CTE)/180]$$

On the other hand, when the injection mode is determined to be the high-pressure injection mode by the determination in step P21, information on target injection ending time phases for high-pressure injection stored in the storage device (ROM) of the controller 30 is read in accordance with an actual engine load and engine speed and is set as CTE, both in step P37. By the way, this information on target injection ending time phases for high-pressure injection is stored in the form of data maps in the storage device, one for compression-stroke injection and the other for intake-stroke injection. When the injection mode is for an intake stroke (injection mode flag: B), the data map for intake-stroke injection is selectively used. When the injection mode is for a compression-stroke (injection mode map: C), on the other hand, the data map for compression-stroke injection is selectively employed.

When the injection mode is in an intake mode, processing operations of step P31 onwards are instructed as in low-pressure injection, but in the case of the compression-stroke injection mode, the processing of step P39 is instructed (step P38). In step P39, injection starting time data TS3 and injection ending time data TE3—which are to be inputted to the valve-opening register and the valve-closing register for the cylinder J near the compression bottom dead center, respectively—are calculated in accordance with the following arithmetic formulas on the basis of the target injection ending time phase CTE, an injection pulse width PW, a current time TM and a cranking period PD.

$$TS3=TM+[PD \times (185-CTE)/180]-PW$$

$$TS3=TM+[PD \times (185-CTE)/180]$$

The calculation results are set in the corresponding registers for the injection valve of the cylinder J (step P40).

To assure a fuel injection quantity at the time of a sudden increase in the engine speed, for example, shortly after a start-up in the modification of FIG. 19 and FIG. 20, it is only necessary to execute step P14 shown in FIG. 16 and FIG. 17 instead of steps P32,P33 and if injection has not been started at BTDC365 at the time of low-pressure injection, to start injection at BTDC365 forcedly (irrespective of the valve opening time data stored in the valve-opening register).

The above embodiments and modification were described based on four-cylinder engines. It should however be borne in mind that the number of cylinders of an internal combustion engine to which the present invention can be applied is optional. If a signal indicating the time around the beginning of an exhaust stroke (BTDC545=a second trigger signal), a signal indicating the time around the beginning of an intake stroke (BTDC365=a first trigger signal), a signal indicating the time around the beginning of a compression stroke (BTDC185) and a signal indicating the time around the beginning of an explosion stroke (BTDC5) are used as trigger signals for a particular cylinder, these trigger signals make it possible to form all trigger signals indicating particular phases (i.e., the time around the beginning of an exhaust stroke, the time around the beginning of an intake stroke, the time around the beginning of a compression stroke, and the time around the beginning of an explosion stroke) of each of the cylinders of a 4-cylinder, 8-cylinder or 12-cylinder engine. The construction can therefore be simplified.

Further, in the above embodiments and modification, the fuel feed pressure setting means 121 was constructed of the controller 30, the electromagnetic directional control valve 14, the low-pressure control valve 9,. the high-pressure control valve 10, the fixed restrictor 15 and the like, and the fuel pressure was changed over between two levels, one for the time of a start-up and the other for the time of an ordinary operation or the like. The fuel feed pressure setting means may be of such a type that the fuel pressure is continuously varied according to the operation state and is set at a rather low level in a specific operation state including the time of a start-up.

Capability of Exploitation in Industry

The fuel injection control system according to the present invention is suited for use in an in-cylinder injection internal combustion engine which is of the spark ignition type and injects fuel directly into its combustion chamber or chambers. The fuel injection control system can achieve fine and precise control of fuel injection. In particular, fuel can be supplied in a required quantity even at the time of a low-temperature start-up, thereby assuring a smooth start-up.

We claim:

1. A fuel injection control system for an in-cylinder injection internal combustion engine, said system comprising:

a fuel injection valve arranged at a cylinder for injecting fuel into said cylinder;

fuel feed pressure setting means for setting a fuel injection pressure of said fuel injection valve at a low pressure in a specific operation state including the time of a start-up of said internal combustion engine and setting said fuel injection pressure at a high pressure in an operation state other than said specific operation state; and fuel injection control means for setting an injection period of said fuel injection valve as a period longer than a period of a single stroke in an operation cycle of said internal combustion engine in said specific operation state.

2. The system according to claim 1, wherein upon setting said injection period longer than said period of said single stroke, said fuel injection control means sets said injection period as a period ranging from an exhaust stroke to an intake stroke.

3. The system according to claim 1, wherein said fuel injection control means (120) sets an injection period of said fuel injection valve in accordance with at least one engine operation parameter including an engine temperature in said specific operation state so that in a first operation state, said injection period becomes a period longer than the period of a single stroke in an operation cycle of said internal combustion engine and that in an operation state other than said first operation state, said injection period becomes a period not longer than said period of said single stroke.

4. The system according to claim 3, wherein said fuel injection control means sets said injection period so that injection of fuel is performed during a period ranging from an exhaust stroke to an intake stroke in said first operation state and that said injection is performed during said intake stroke in said operation state other than said first operation state.

5. The system according to claim 4, wherein said fuel injection control means sets an injection ending time of said fuel injection valve in said first operation state at a time around a starting time of a compression stroke and sets an injection starting time of said fuel injection valve in said operation state other than said first operation state at a time around a starting time of said intake stroke or at a time during said intake stroke.

6. The system according to claim 5, wherein in said operation state other than said first operation state, said fuel injection control means sets said injection ending time at a time around a preset phase set as an injection ending time for a high-pressure injection time within a former half of said intake stroke when injection of fuel is completed until said preset phase, but sets said injection starting time at a time around said starting time of said intake stroke when injection of fuel is not completed until said preset phase.

7. The system according to claim 1, wherein said fuel injection control means (120) sets an injection period of said fuel injection valve in said specific operation state in accordance with at least one engine operation parameter including an engine temperature, and sets an injection starting time so that injection of fuel is started in an exhaust stroke and is ended around a starting time of a compression stroke when said injection period is longer than the period of a single stroke in an operation cycle of said internal combustion engine and that said injection of fuel is performed in an intake stroke when said injection period is not longer than said period of said single stroke in said operation cycle of said internal combustion engine.

8. The system according to claim 1, wherein said fuel injection control means (120) sets, in said specific operation state, an injection period of said fuel injection valve in accordance with at least one engine operation parameter including an engine temperature, and a fuel injection starting time in accordance with at least said engine temperature and an engine speed so that injection of fuel is performed during a period ranging from an exhaust stroke to an intake stroke or during said intake stroke, and wherein said fuel injection control means sets, in an operation period other than said specific operation state, said injection period in accordance with at least one engine operation parameter including an engine load, and said fuel injection starting time in accordance with at least said engine load and said engine speed so that injection of fuel is performed during said intake stroke or a compression stroke.

9. A fuel injection control system for an in-cylinder injection internal combustion engine, said system comprising:

a fuel injection valve arranged at a cylinder for injecting fuel into said cylinder;

fuel feed pressure setting means for setting a fuel injection pressure of said fuel injection valve at a low pressure in a specific operation state including a start-up of said internal combustion engine and setting said fuel injection pressure at a high pressure in an operation state other than said specific operation state; and fuel injection control means for setting an injection period of said fuel injection valve in accordance with at least one engine operation parameter including an engine temperature so that said injection period is extended as the engine temperature becomes lower and also setting, at the time of a start-up at a low temperature, an injection starting time of said fuel injection valve so that injection of fuel started in an exhaust stroke and is ended by a phase close to a starting time of a compression stroke.

10. A fuel injection control system for an in-cylinder injection internal combustion engine, said system comprising:

a fuel injection valve arranged at a cylinder for injecting fuel into said cylinder;

fuel feed pressure setting means for setting a fuel injection pressure of said fuel injection valve at a low pressure in a specific operation state including a start-up of said internal combustion engine and setting said fuel injection pressure at a high pressure in an operation state other than said specific operation state; and fuel injection control means for setting an injection ending time of said fuel injection valve so that said injection ending time in said specific operation state substantially equals to an injection ending time in an operation state other than said specific operation state immediately after a change-over from said specific operation state to said operation state other than said specific operation state.

11. The system according to claim 10, wherein said injection ending time immediately after said change-over is set at a preset phase during a former half of an intake stroke; and said fuel injection control means sets said injection ending time at a time around said preset phase when said injection period in said specific operation state is shorter than a stroke period from a time around a starting time of said intake stroke to said preset phase, and delays said injection ending time beyond said preset phase when said injection period in said specific operation state is longer than said stroke period.

12. A fuel injection control system for an in-cylinder injection internal combustion engine, said system comprising:

a fuel injection valve arranged at a cylinder for injecting fuel into said cylinder;

fuel feed pressure setting means for setting a fuel injection pressure of said fuel injection valve at a low pressure in a specific operation state including a start-up of said internal combustion engine and setting said fuel injection pressure at a high pressure in an operation state other than said specific operation state; and fuel injection control means for setting, in said specific operation state, an injection starting time of said fuel injection valve so that injection of fuel is ended before a starting time of a compression stroke, setting, in an operation state other than said specific operation state, said injection starting time in accordance with at least one operation parameter including an engine load so that injection of fuel is performed in an intake stroke or said compression stroke, and setting, immediately after a change-over from said specific operation state to said operation state other than said specific operation state, said injection starting time so that injection of fuel is performed in said intake stroke.

13. The system according to claim 12, wherein said fuel injection control means controls said fuel injection valve so that in said specific operation state, injection of fuel is started at a time around a starting time of an intake stroke or before said time around said starting time of said intake stroke.

14. A fuel injection control system for an in-cylinder injection internal combustion engine, said system comprising:

a fuel injection valve arranged at a cylinder for injecting fuel into said cylinder;

fuel feed pressure setting means for setting a fuel injection pressure of said fuel injection valve at a low pressure in a specific operation state including the time of a start-up of said internal combustion engine and setting said fuel injection pressure at a high pressure in an operation state other than said specific operation state;

signal generating means for generating a first trigger signal and a second trigger signal at a time around a starting time of an intake stroke and at a time during a specific stroke phase before said time around said starting time of said intake stroke, respectively, in relation to said cylinder; and fuel injection control means for computing a fuel injection starting time of said fuel injection valve coincidently with generation of said second trigger signal so that said injection starting time of said fuel injection valve becomes a desired time within a period ranging from an exhaust stroke to an intake stroke, measuring an elapsed time period from said generation of said second trigger signal to control valve-opening drive of said fuel injection valve so that said fuel injection valve is opened at said desired time, and, when said fuel injection valve is not open at the time of generation of said first trigger signal, opening said fuel injection valve in preference to the results of said measurement.

15. The system according to claim 14, wherein said internal combustion engine is provided with 4N (N: natural number) cylinders; and said second trigger signal for a particular one of said cylinders is formed commonly with said first trigger signal for another one of said cylinders.

16. A fuel injection control system for an in-cylinder injection internal combustion engine, said system comprising:

a fuel injection valve arranged at a cylinder for injecting fuel into said cylinder;

fuel feed pressure setting means for setting a fuel injection pressure of said fuel injection valve at a low pressure in a specific operation state including a start-up of said internal combustion engine and setting said fuel injection pressure at a high pressure in an operation state other than said specific operation state; and fuel injection setting means for setting, in said specific operation state, an injection period of said fuel injection valve as a period ranging from a vicinity of a starting time of an intake stroke or a timing in an exhaust stroke to a vicinity of a starting time of a compression stroke in accordance with at least one engine operation parameter including an engine temperature.

* * * * *